(12) United States Patent
Yoshino et al.

(10) Patent No.: US 10,971,965 B2
(45) Date of Patent: Apr. 6, 2021

(54) MOTOR AND BLOWER APPARATUS

(71) Applicant: Nidec Corporation, Kyoto (JP)

(72) Inventors: Shingo Yoshino, Kyoto (JP); Tomoaki Ando, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 62 days.

(21) Appl. No.: 16/365,754

(22) Filed: Mar. 27, 2019

(65) Prior Publication Data

US 2019/0305627 A1 Oct. 3, 2019

(30) Foreign Application Priority Data

Mar. 30, 2018 (JP) .............................. JP2018-069814

(51) Int. Cl.
| | |
|---|---|
| *H02K 3/52* | (2006.01) |
| *H02K 3/18* | (2006.01) |
| *F04D 25/06* | (2006.01) |
| *H02K 1/14* | (2006.01) |
| *H02K 3/32* | (2006.01) |
| *H02K 7/14* | (2006.01) |
| *H02K 21/22* | (2006.01) |

(52) U.S. Cl.
CPC ......... *H02K 3/522* (2013.01); *F04D 25/0606* (2013.01); *H02K 1/146* (2013.01); *H02K 3/325* (2013.01); *H02K 7/14* (2013.01); *H02K 21/22* (2013.01); *H02K 2203/03* (2013.01)

(58) Field of Classification Search
CPC ............ F04D 25/0606; F04D 25/0613; F04D 25/0646; H02K 3/18; H02K 15/0435; H02K 3/46; H02K 5/00; H02K 3/32; H02K 3/325; H02K 3/34; H02K 3/345; H02K 3/52; H02K 3/522; H02K 1/14; H02K 1/146; H02K 1/148; H02K 3/351; H02K 5/50
USPC ......................................................... 310/194
See application file for complete search history.

(56) References Cited

U.S. PATENT DOCUMENTS

| | | | | |
|---|---|---|---|---|
| 4,540,906 A | * | 9/1985 | Blom ...................... | H02K 1/187 29/596 |
| 5,264,748 A | * | 11/1993 | Ootsuka .................. | F16C 17/04 310/90 |
| 5,278,468 A | * | 1/1994 | Escaravage ............ | H02K 1/187 310/234 |
| 7,679,230 B2 | * | 3/2010 | Yamada .............. | F04D 25/0633 310/43 |

(Continued)

FOREIGN PATENT DOCUMENTS

JP       2009148103 A   *   7/2009   ............... H02K 3/52

*Primary Examiner* — Burton S Mullins
(74) *Attorney, Agent, or Firm* — Keating & Bennett

(57) ABSTRACT

A motor includes a rotor, a stator, and a circuit board below the stator. The stator includes an insulator to cover at least a portion of each of an upper surface, a lower surface, and circumferential side surfaces of each of teeth of the stator, coils each of which is defined by a conducting wire wound around a separate one of the teeth with the insulator therebetween, and a drawn-out wire drawn out from the coils and electrically connected to the circuit board. A lower portion of the insulator includes a guide radially outward of the coils and including a wall extending downward from a lower surface of the insulator and a bend extending radially outward from a lower end of the wall. At least a portion of the drawn-out wire extends in a circumferential direction along a radially outer surface of the wall.

9 Claims, 18 Drawing Sheets

(56) References Cited

U.S. PATENT DOCUMENTS

| | | | | |
|---|---|---|---|---|
| 7,880,360 B2 * | 2/2011 | Yamawaki | ............. | H02K 3/522 |
| | | | | 310/215 |
| 7,923,872 B2 * | 4/2011 | Sahara | .................. | H02K 3/522 |
| | | | | 310/71 |
| 7,994,669 B2 * | 8/2011 | Lin | ........................ | H02K 1/187 |
| | | | | 310/67 R |
| 8,247,935 B2 * | 8/2012 | Onozawa | ............... | H02K 29/08 |
| | | | | 310/68 B |
| 8,496,447 B2 * | 7/2013 | Ida | ....................... | H02K 5/1675 |
| | | | | 417/354 |
| 8,598,764 B2 * | 12/2013 | Horng | ..................... | H02K 3/34 |
| | | | | 310/194 |
| 8,674,570 B2 * | 3/2014 | Yamazaki | .............. | H02K 5/225 |
| | | | | 310/71 |
| 9,350,207 B2 * | 5/2016 | Oguma | ............... | H02K 15/0075 |
| 2008/0079325 A1 | 4/2008 | Yamada et al. | | |
| 2013/0234547 A1 | 9/2013 | Oguma | | |
| 2018/0205281 A1 * | 7/2018 | Yoshida | ............. | H02K 15/0435 |
| 2019/0221361 A1 * | 7/2019 | Manz | ................... | H01F 27/306 |

* cited by examiner

MOTOR AND BLOWER APPARATUS

CROSS REFERENCE TO RELATED APPLICATION

This application claims the benefit of priority to Japanese Patent Application No. 2018-069814 filed on Mar. 30, 2018. The entire contents of this application are hereby incorporated herein by reference.

BACKGROUND OF THE DISCLOSURE

1. Field of the Disclosure

The present disclosure relates to a motor, and a blower apparatus including the same.

2. Description of the Related Art

A rotor of a known brushless motor includes a shaft, a frame, and a rotor magnet. The shaft is supported to be rotatable with respect to an oil-bearing metal fixed in a bracket through press fitting. Meanwhile, an armature including a stator core and a copper wire wound around the stator core with an insulator made of a resin therebetween is fixed to an outside of the bracket through press fitting. Further, a printed circuit board on which a circuit to drive and control the motor is mounted is adhered and thus fixed to a mounting base portion included in the bracket through a double-sided tape (not shown). End portions of the copper wire of the armature are arranged on the printed circuit board to define a stator.

However, in the known brushless motor, the end portions of the conducting wire of the armature are arranged on the printed circuit board axially below the stator. At this time, the end portions of the conducting wire may sometimes become loose, making a wiring operation difficult.

SUMMARY OF THE DISCLOSURE

A motor according to an example embodiment of the present disclosure includes a shaft, a rotor, a stator, and a circuit board. The shaft extends along a central axis extending in a vertical direction. The rotor is capable of rotating about the central axis. The stator is radially opposite to the rotor. The circuit board is below the stator. The stator includes an annular core back, a plurality of teeth extending radially from the core back and arranged in a circumferential direction, an insulator to cover at least a portion of each of an upper surface, a lower surface, and circumferential side surfaces of each of the teeth, coils each of which is defined by a conducting wire wound around a separate one of the teeth with the insulator therebetween, and a drawn-out wire drawn out from the coils, and electrically connected to the circuit board. A lower portion of the insulator includes a guide located radially outward of the coils. The guide includes a first wall extending downward from a lower surface of the insulator, and a bend extending radially outward from a lower end of the first wall. At least a portion of the drawn-out wire extends in the circumferential direction along a radially outer surface of the first wall.

The motor according to an example embodiment of the present disclosure can be easily assembled.

The above and other elements, features, steps, characteristics and advantages of the present disclosure will become more apparent from the following detailed description of the example embodiments with reference to the attached drawings.

DETAILED DESCRIPTION OF THE EXAMPLE EMBODIMENTS

Hereinafter, example embodiments of the present disclosure will be described in detail with reference to the accompanying drawings. It is assumed herein that, with respect to a blower apparatus A, a direction parallel to a central axis J of the blower apparatus A is referred to by the term "axial direction", "axial", or "axially", that directions perpendicular to the central axis J of the blower apparatus A are each referred to by the term "radial direction", "radial", or "radially", and that a direction along a circular arc centered on the central axis J of the blower apparatus A is referred to by the term "circumferential direction", "circumferential", or "circumferentially". Similarly, with respect to an impeller 20 installed in the blower apparatus A, directions corresponding to an axial direction, a radial direction, and a circumferential direction with respect to the blower apparatus A are referred to simply as the axial direction, the radial direction, and the circumferential direction, respectively. It is also assumed herein that the axial direction with respect to the blower apparatus A is a vertical direction. It should be noted, however, that the above definition of the vertical direction is made simply for the sake of convenience in description, and is not meant to restrict relative positions or directions of different members or portions of the blower apparatus A when in use.

Figure 1:
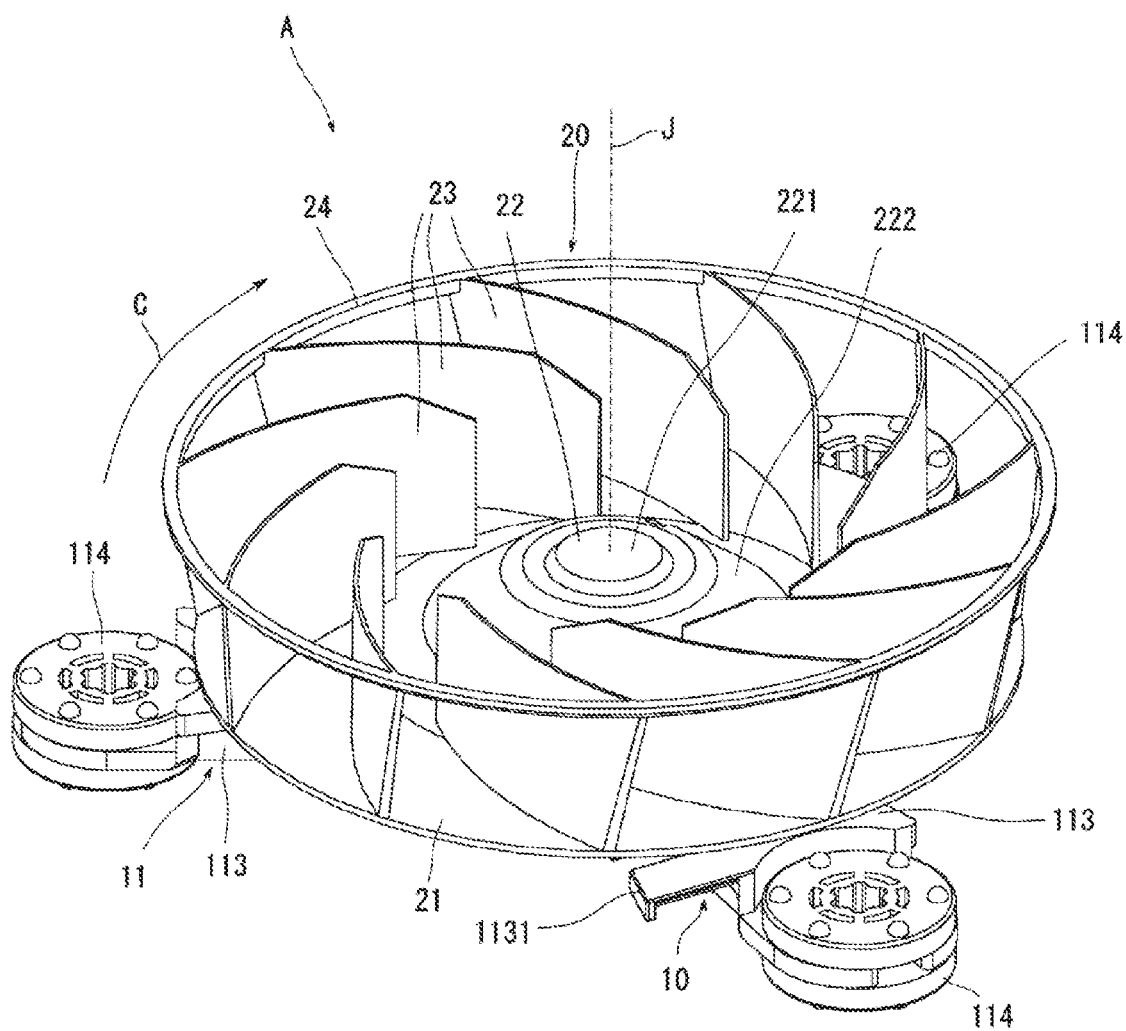
FIG. 1 is a perspective view of a blower apparatus according to an example embodiment of the present disclosure.
Figure 2:
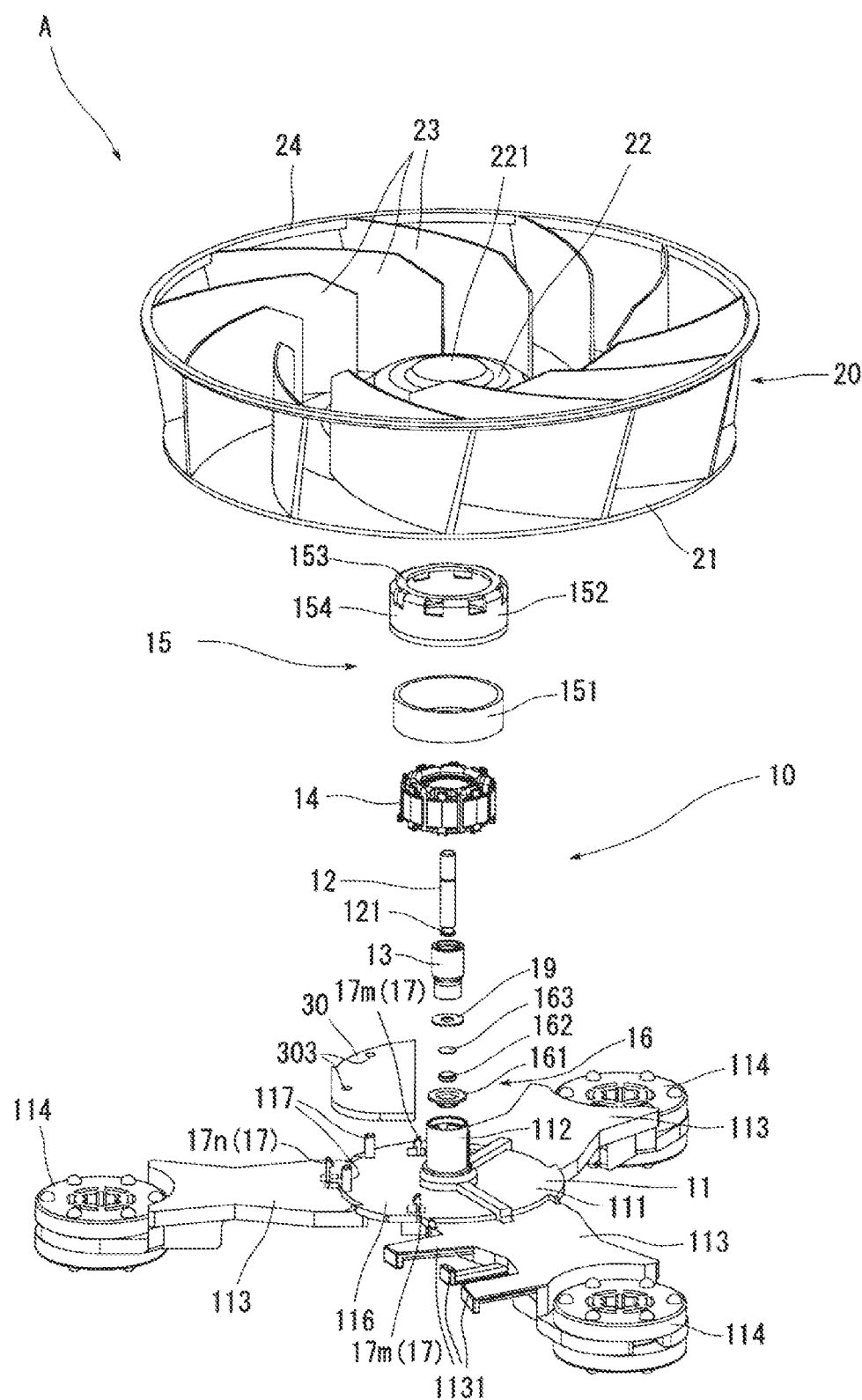
FIG. 2 is an exploded perspective view of the blower apparatus according to an example embodiment of the present disclosure.
Figure 3:
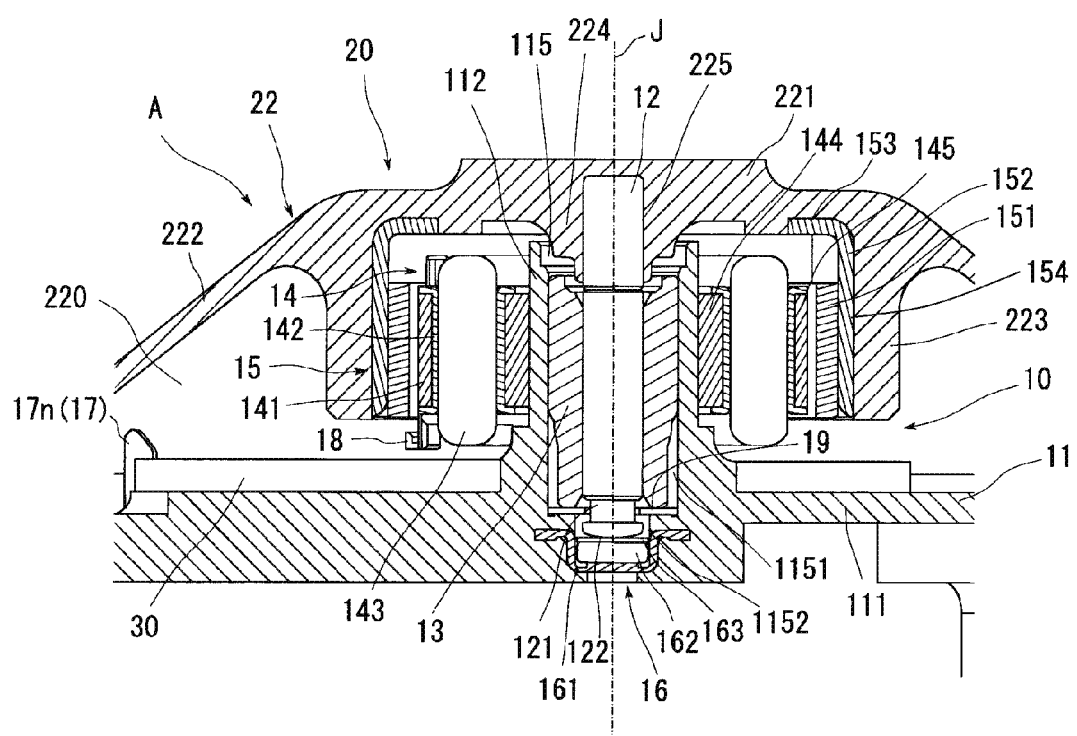
FIG. 3 is a vertical sectional view of the blower apparatus taken along a plane including a central axis.

A blower apparatus A according to an example embodiment of the present disclosure will now be described below. FIG. 1 is a perspective view of the blower apparatus A according to an example embodiment of the present disclosure. FIG. 2 is an exploded perspective view of the blower apparatus A according to an example embodiment of the present disclosure. FIG. 3 is a vertical sectional view of the blower apparatus A taken along a plane including the central axis J. The blower apparatus A includes a motor 10 and an impeller 20.

The impeller 20 is arranged to rotate about the central axis J, which extends in the vertical direction. The motor 10 is arranged below the impeller 20 to rotate the impeller 20.

The impeller 20 is an impeller of a so-called centrifugal fan, which is arranged to generate an air flow traveling radially outward through rotation. When the impeller 20 is rotating, air is taken in through a radially central portion of an axially upper surface of the impeller 20, and the air taken in is sent radially outward. The impeller 20 is, for example, a casting made of a resin. An engineering plastic, for example, may be used as the resin of the impeller 20. The engineering plastic is a resin being excellent in mechanical characteristics, such as, for example, strength and heat resistance. Note that the impeller 20 may alternatively be made of a material such as a metal or the like.

Referring to FIGS. 1, 2, and 3, the impeller 20 includes an impeller base 21, an impeller hub 22, a plurality of blades 23, and a support frame 24. The impeller base 21 is in the shape of a disk. The impeller hub 22 is arranged to extend upward from a radially central portion of the impeller base 21. The impeller base 21 is in the shape of a circular ring, and a radially inner edge of the impeller base 21 is joined to a radially outer edge of the impeller hub 22. More specifically, the impeller base 21 is joined to a radially outer edge of a hub slanting portion 222, which will be described below, of the impeller hub 22.

The plurality (here, eleven, as illustrated in FIG. 1) of blades 23 are arranged at regular intervals in the circumferential direction on a radially outer side of the impeller hub 22 on an upper surface of the impeller base 21. A radially inner portion of each blade 23 is arranged forward of a radially outer portion of the blade 23 with respect to a rotation direction (indicated by an arrow C in FIG. 1) of the impeller 20. Thus, rotation of the impeller 20 in the rotation direction C generates an air flow traveling radially outward. The support frame 24 is in the shape of a circular ring, and is joined to a radially outer edge of an upper end of each of the blades 23. The support frame 24 is fixed to the blades 23.

The support frame 24 is a reinforcing member arranged to reinforce the blades 23 by joining the blades 23 together.

The impeller hub 22 includes a hub top plate portion 221, the hub slanting portion 222, a hub tubular portion 223, and a boss portion 224. The hub top plate portion 221 is in the shape of a disk, extending radially. A radially outer edge of the hub top plate portion 221 is joined to the hub slanting portion 222. The hub slanting portion 222 is in the shape of a circular ring in a cross-section taken along a plane perpendicular to the central axis J, and is arranged to slant radially outward as it extends axially downward. That is, the impeller hub 22 is in the shape of a so-called truncated cone, i.e., a cone having a top portion thereof cut off.

Referring to FIG. 3, a lower surface recessed portion 220, which is recessed upward, is defined in a lower surface of the impeller hub 22. Each of the hub tubular portion 223 and the boss portion 224 is arranged inside of the lower surface recessed portion 220. The boss portion 224 is a projecting portion arranged to project downward at a radially central portion of a lower surface of the hub top plate portion 221.

A hole portion 225 is defined at a center (on the central axis J) of a lower surface of the boss portion 224. The hole portion 225 is cylindrical, extending along the central axis J, and a center of the hole portion 225 overlaps with the central axis J. An upper end portion of a shaft 12, which will be described below, of the motor 10 is fixed in the hole portion 225. That is, the impeller 20 is fixed to the shaft 12. The impeller 20 and the shaft 12 are fixed to each other through the shaft 12 being fixed in the hole portion 225. The impeller 20 is arranged to rotate about the central axis J with the shaft 12 as a rotating shaft. Note that, although the shaft 12 and the impeller 20 are fixed to each other by an insert molding process in the present example embodiment, this is not essential to the present disclosure. The shaft 12 and the impeller 20 may alternatively be fixed to each other through, for example, press fitting, adhesion, or welding. Also note that the upper end portion of the shaft 12 may alternatively be screwed with a screw being inserted into the impeller hub 22 from above an upper surface of the impeller hub 22 and passing through the impeller hub 22 in the axial direction. Various methods by which the impeller 20 and the shaft 12 can be firmly fixed to each other can be widely adopted as a method for fixing the impeller 20 and the shaft 12 to each other.

The hub tubular portion 223 is cylindrical, and is arranged to extend axially downward from the lower surface of the hub top plate portion 221. A center of the hub tubular portion 223 coincides with the central axis J. A magnet holder 152, which will be described below, is fixed to an inner surface of the hub tubular portion 223. The magnet holder 152 is arranged to hold a rotor magnet 151. A center of the rotor magnet 151 coincides with the central axis J as a result of the magnet holder 152 being fixed to the hub tubular portion 223. In the present example embodiment, the magnet holder 152 and the hub tubular portion 223 are fixed to each other by an insert molding process. Note that the magnet holder 152 and the hub tubular portion 223 may not necessarily be fixed to each other by the insert molding process, and that various methods by which the magnet holder 152 and the hub tubular portion 223 can be firmly fixed to each other can be widely adopted.

Referring to FIGS. 2 and 3, the motor 10 is arranged axially below the impeller 20. The motor 10 includes a base portion 11, the shaft 12, a bearing 13, a stator 14, and a rotor 15. The motor 10 is a so-called outer-rotor brushless motor, in which the rotor 15, which is arranged radially opposite to a radially outer surface of the stator 14, is arranged to rotate about the central axis J. That is, the motor 10 includes the rotor 15, which is arranged to be capable of rotating about the central axis J. In addition, the stator 14 is arranged radially opposite to the rotor 15. The motor 10 further includes a circuit board 30.

Referring to FIGS. 2 and 3, the base portion 11 is a plate-shaped member arranged below the rotor 15. The base portion includes a plate portion 111, a housing 112, and three arm portions 113. The plate portion 111 is arranged in a radial center of the base portion 11 when viewed in the axial direction. In addition, the housing 112 is tubular, and is arranged to extend upward from a radially central portion of an upper surface of the plate portion 111 along the central axis J. The stator 14 is fixed to a radially outer surface of the housing 112.

The three arm portions 113 are arranged to extend radially outward from a radially outer edge of the plate portion 111. The three arm portions 113 are arranged at regular intervals in the circumferential direction. A vibration isolating member 114, which is arranged to prevent or reduce transfer of vibration to the blower apparatus A, is attached to a radially distal end of each arm portion 113. The blower apparatus A is attached to a target device with the vibration isolating members 114 being in contact with the target device. Note that each vibration isolating member 114 may be attached only when needed. The base portion 11 is a casting made of a resin, and the plate portion 111, the housing 112, and the arm portions 113 are molded of the same material. One of the arm portions 113 includes lead wire leading portions 1131 each of which is arranged to hold a lead wire, which will be described below.

The base portion 11 includes a recessed holding portion 115 being recessed from an upper surface of the housing 112 along the central axis J. The bearing 13 and the shaft 12 are fitted in the recessed holding portion 115. The recessed holding portion 115 includes a bearing holding portion 1151 in which the bearing 13 is held, and a decreased diameter portion 1152 joined to a lower end portion of the bearing holding portion 1151, and arranged to have a diameter smaller than that of the bearing holding portion 1151. A lower end portion of the bearing 13 and a bottom surface of the bearing holding portion 1151 are arranged to hold a retaining ring 19, which will be described below, therebetween in the axial direction.

The shaft 12 is made of a magnetic material, and is in the shape of a column extending along the central axis J. That is, the shaft 12 is made of the magnetic material, and is arranged to extend along the central axis J. The shaft 12 is made of, for example, iron. The shaft 12 includes a retaining groove 121 and a lower surface convex portion 122. The retaining groove 121 is a groove recessed radially and arranged to extend in the circumferential direction. The retaining ring 19, which will be described below, is fitted into the retaining groove 121. The retaining ring 19 is fixed by being held between a lower surface of the bearing 13 and the bottom surface of the bearing holding portion 1151. In addition, the lower surface convex portion 122 is defined in a lower surface of the shaft 12. The lower surface convex portion 122 is a curved surface arranged to slope toward a center as it extends axially downward. A radial center of the lower surface convex portion 122 is arranged to be in contact with a thrust plate 163, which will be described below.

The shaft 12 is arranged to rotate with the lower surface convex portion 122 being in contact with the thrust plate 163. It is preferable that the area of contact between the lower surface convex portion 122 and the thrust plate 163 is smaller, in order to reduce resistance during rotation. However, at least one of the lower surface convex portion 122 and the thrust plate 163 may become deformed when, for example, the lower surface convex portion 122 and the thrust plate 163 are in contact at one point. Therefore, it is preferable that the lower surface convex portion 122 is arranged to have such a shape that both a reduction in the area of contact between the lower surface convex portion 122 and the thrust plate 163 and a reduction in a stress concentration on the area of contact therebetween can be achieved. Examples of such a shape include smooth, in other words, differentiable, curved surfaces, such as a spherical surface and a paraboloid of revolution. Note that various other shapes that are able to achieve both a reduction in contact resistance and a reduction in the stress concentration on the area of contact can be widely adopted.

The bearing 13 is cylindrical, and is press fitted into the recessed holding portion 115. The bearing 13 is thus fixed in the recessed holding portion 115. That is, the bearing 13 is fixed to the housing 112. The bearing 13 is arranged to support the shaft 12. The bearing 13 defines a fluid bearing, and a film of an oil (not shown) for lubrication is arranged between an inner surface of the bearing 13 and an outer surface of the shaft 12. The film of the oil reduces frictional resistance between the inner surface of the bearing 13 and the outer surface of the shaft 12. That is, the shaft 12 is supported to be rotatable with respect to the bearing 13. In other words, the shaft 12 is supported to be rotatable with respect to the base portion 11 to which the bearing 13 is fixed. At least the inner surface of the bearing 13 is arranged to have such a structure as to circulate the oil in (or supply the oil to) a gap between the inner surface of the bearing 13 and the outer surface of the shaft 12. Examples of such a structure include a porous body.

The shaft 12 is supported to be rotatable with respect to the bearing 13. In addition, the impeller 20 is fixed to the shaft 12 above the bearing 13, more preferably, above the housing 112. Further, a portion of the shaft 12 at a lower end (i.e., a lower end portion of the shaft 12) is arranged to project downwardly of the bearing 13. The portion of the shaft 12 which projects downwardly of the bearing 13 is arranged in the decreased diameter portion 1152. The lower end portion of the shaft 12 corresponds to a portion of the shaft 12 which is below the retaining groove 121.

The motor 10 includes the retaining ring 19, which is arranged to prevent the shaft 12 from coming off. The retaining ring 19 is fixed by being held between a lower end surface of the bearing 13 and the bottom surface of the bearing holding portion 1151. The retaining ring 19 is in the shape of a circular ring, and is arranged to have the shaft 12 pass therethrough. In other words, the retaining ring 19 is arranged axially opposite to the retaining groove 121 of the shaft 12. A through hole of the retaining ring 19 is arranged to have a diameter greater than the diameter of a bottom surface of the retaining groove 121. Further, the diameter of the through hole of the retaining ring 19 is arranged to be smaller than the outside diameter of each of portions of the shaft 12 which are adjacent to the retaining groove 121 on upper and lower sides of the retaining groove 121. Accordingly, when the shaft 12 is moved upward, a side wall of the retaining groove 121 is brought into axial contact with the retaining ring 19. The shaft 12 is thus prevented from coming off in the axial direction.

Figure 4:
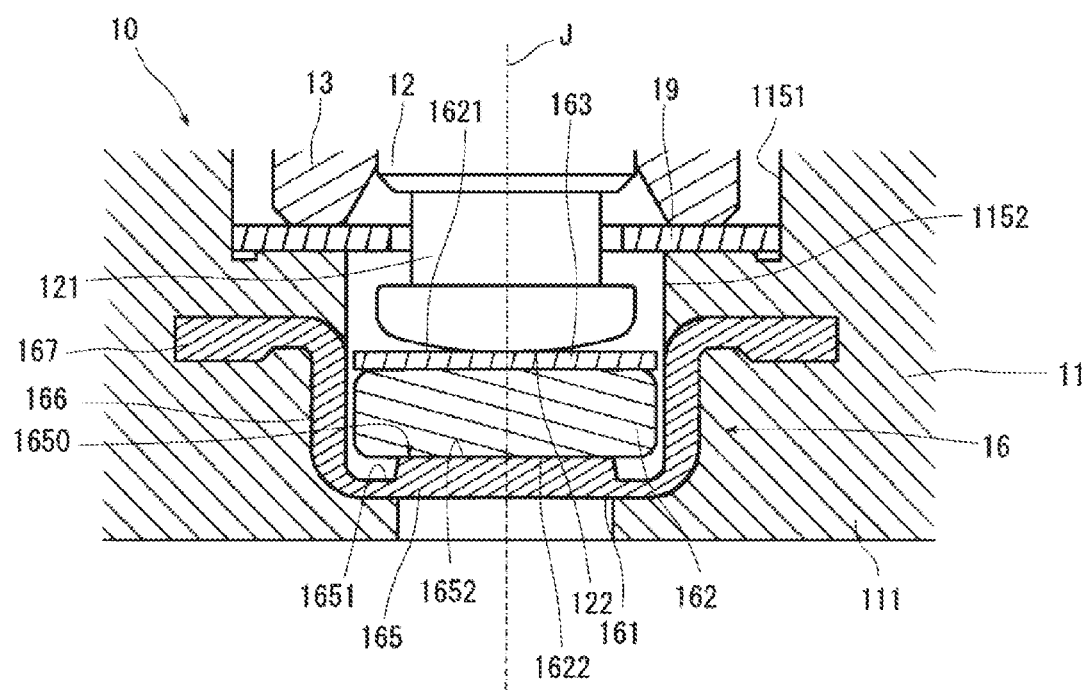
FIG. 4 is an enlarged sectional view illustrating a portion of a housing according to an example embodiment of the present disclosure in which a tip holder and an attraction magnet are illustrated in an enlarged form.
Figure 5:
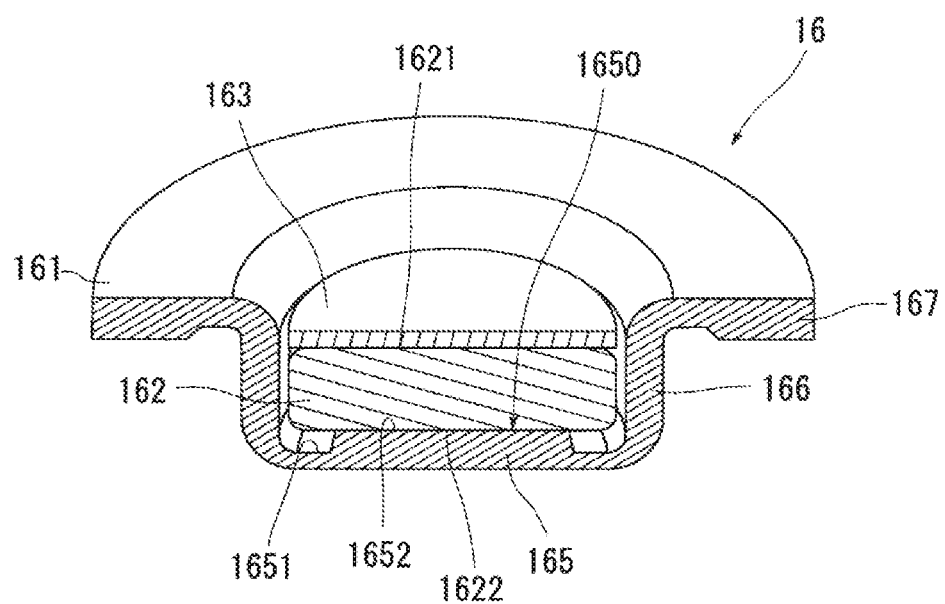
FIG. 5 is a perspective sectional view illustrating vertical sections of the tip holder, the attraction magnet, and a thrust plate according to an example embodiment of the present disclosure.
Figure 6:
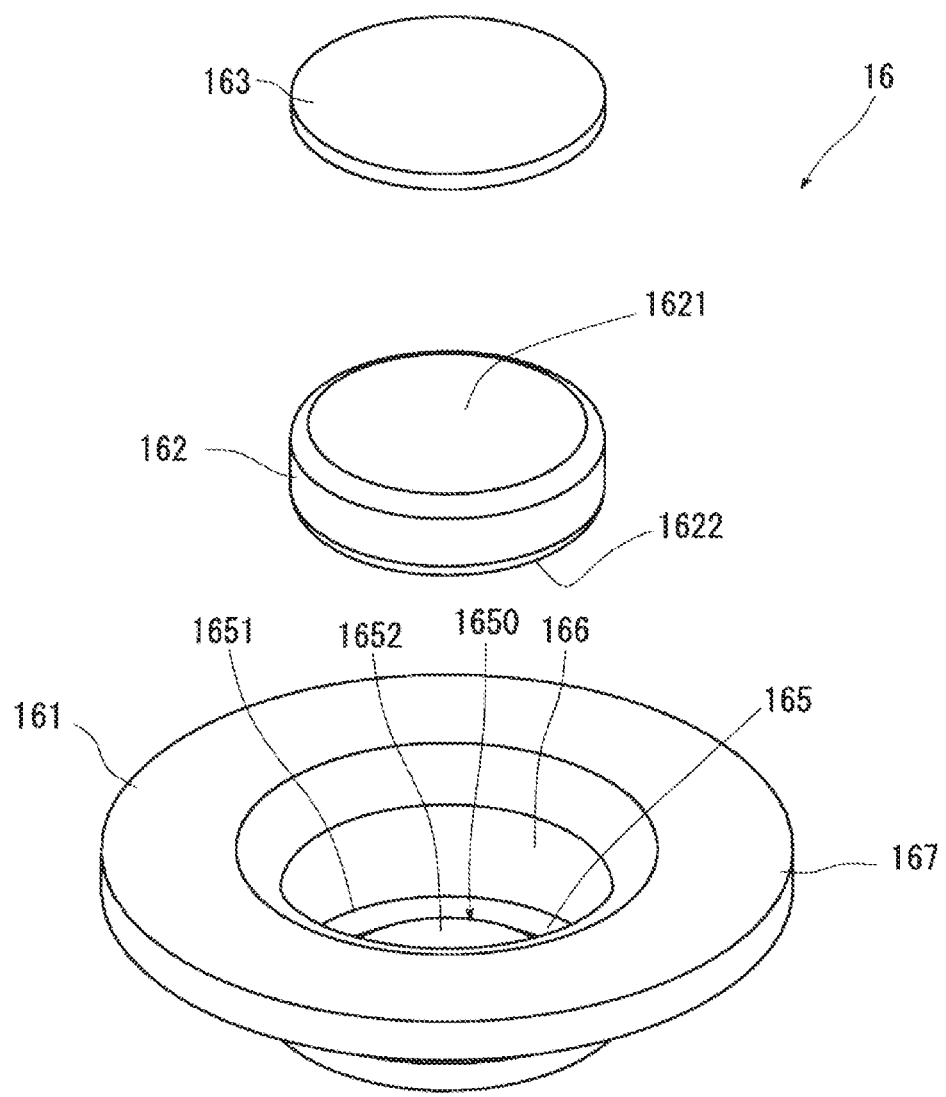
FIG. 6 is an exploded perspective view of the tip holder, the attraction magnet, and the thrust plate.

As mentioned above, each of the outer surface of the shaft 12 and the inner surface of the bearing 13 is lubricated by the oil, and therefore, the shaft 12 tends to easily move not only in the circumferential direction but also in the axial direction with respect to the bearing 13. Accordingly, the motor 10 includes a magnetic attraction portion 16 arranged to restrain the shaft 12 from moving upward. The magnetic attraction portion 16 will be described in detail below with reference to the drawings. FIG. 4 is an enlarged sectional view illustrating a portion of the housing 112 in which a tip holder 161 and an attraction magnet 162 are arranged in an enlarged form. FIG. 5 is a perspective sectional view illustrating vertical sections of the tip holder 161, the attraction magnet 162, and the thrust plate 163. FIG. 6 is an exploded perspective view of the tip holder 161, the attraction magnet 162, and the thrust plate 163.

Referring to FIGS. 4 to 6, the magnetic attraction portion 16 includes the tip holder 161, the attraction magnet 162, and the thrust plate 163. The tip holder 161 includes a bottom portion 165, a tubular portion 166, and a flange portion 167. The bottom portion 165 is in the shape of a disk, and is arranged to be perpendicular to the central axis J. Note that the bottom portion 165 may not necessarily be in the shape of a disk, but may alternatively be in the shape of a polygon when viewed in the axial direction. The shape of the bottom portion 165 may be arranged to match the shape of the attraction magnet 162 housed in the tip holder 161. The tubular portion 166 is cylindrical, and is arranged to extend upward from a radially outer edge of the bottom portion 165 along the central axis J. The flange portion 167 is in the shape of a circular ring, and is arranged to extend radially outward from an upper end portion of the tubular portion 166. Note that the flange portion 167 may not necessarily be in the shape of a circular ring.

The bottom portion 165, the tubular portion 166, and the flange portion 167 of the tip holder 161 are defined by a single monolithic member. The tip holder 161 is produced by, for example, subjecting a metal sheet to press working, drawing, or the like. An iron sheet, for example, may be used as the metal sheet from which the tip holder 161 is made. The tip holder 161 can be easily produced since the tip holder 161 is defined by subjecting the metal sheet to press working.

When the tip holder 161 is produced by subjecting the metal sheet to press working, the metal sheet is placed on a die, and a portion of the metal sheet which is to become the bottom portion 165 is pressed against the die with a machine tool (i.e., a punch). At this time, a stress is concentrated on a junction of the bottom portion 165 with the tubular portion 166. To minimize an effect of this stress on the bottom portion 165 as a whole, a machine tool in which a surface to press the metal sheet is in the shape of a circular ring is used. As a result, a "bottom portion upper surface" 1650, which is an upper surface of the bottom portion 165, includes a first surface 1651 and a second surface 1652.

The first surface 1651 is deformed by the stress and a residual stress at the time of the press working. On the other hand, the second surface 1652 is hardly deformed because the stress is not easily transferred to the second surface 1652 as the stress is used for deforming the first surface 1651. Therefore, the second surface 1652 is a flat surface perpendicular to the central axis J.

Referring to FIG. 4, the first surface 1651 is arranged at a radially outer edge of the bottom portion 165. In addition, the first surface 1651 is joined to a lower end portion of the tubular portion 166. The first surface 1651 is in the shape of a circular ring. In addition, the second surface 1652 is arranged radially inward of the first surface 1651. A portion of the bottom portion 165 which corresponds to the first surface 1651 has a thickness smaller than that of the original metal sheet, since the first surface 1651 is deformed by a force applied at the time of the press working. On the other hand, a portion of the bottom portion 165 which corresponds to the second surface 1652 has a thickness equal or substantially equal to that of the original metal sheet, since a large force does not act on the second surface 1652 and the second surface 1652 is not deformed. Accordingly, the second surface 1652 lies at a level higher than that of the first surface 1651. Note that, to make the portion of the bottom portion 165 which corresponds to the first surface 1651 thinner than the portion of the bottom portion 165 which corresponds to the second surface 1652, an additional process may be performed on the metal sheet before the press working. In the present example embodiment, a lower surface 1622 of the attraction magnet 162 is arranged to be in contact with the second surface 1652 within the bottom portion upper surface 1650. Accordingly, higher working accuracy is required for the second surface 1652 than for the first surface 1651 in the tip holder 161. The tip holder 161 can be easily produced because, concerning the bottom portion upper surface 1650, the flatness of the first surface 1651 can be set lower than the flatness of the second surface 1652 at the time of the press working of the tip holder 161, for example.

The attraction magnet 162 is in the shape of a column, and each of an upper surface 1621 and the lower surface 1622 of the attraction magnet 162 is perpendicular to a center line of the column. In other words, the upper surface 1621 and the lower surface 1622 are each perpendicular to the center line, and are parallel to each other. The upper surface 1621 and the lower surface 1622 of the attraction magnet 162 define different magnetic poles arranged in the axial direction. In addition, the attraction magnet 162 is housed inside of the tubular portion 166. Here, the tip holder 161 is made of iron, i.e., of a magnetic material. Accordingly, the lower surface 1622 of the attraction magnet 162 is fixed to the second surface 1652 through a magnetic force. Further, a portion of a radially outer surface of the attraction magnet 162 is brought into contact with, and is fixed to, an inner surface of the tubular portion 166 through a magnetic force.

The attraction magnet 162 is arranged to have an axial dimension smaller than that of the tubular portion 166.

Accordingly, the upper surface 1621 of the attraction magnet 162 is arranged at a level lower than that of an upper end of the tubular portion 166. That is, the attraction magnet 162 is housed inside of the tubular portion 166. Thus, the tubular portion 166 serves as a back yoke for the attraction magnet 162 to strengthen the magnetic force of the attraction magnet 162.

The lower surface 1622 of the attraction magnet 162 is arranged to be in contact with at least a portion, e.g., the second surface 1652, of the bottom portion upper surface 1650. As a result, the center line of the attraction magnet 162 is parallel to the central axis J. Note that, when the center line is described as being parallel to the central axis J, it may mean that the center line overlaps with the central axis J. In addition, the upper surface 1621 of the attraction magnet 162 is perpendicular to the central axis J. In the present example embodiment, the lower surface 1622 of the attraction magnet 162 is arranged to be in contact with the second surface 1652 of the bottom portion upper surface 1650.

The thrust plate 163 is arranged above the upper surface 1621 of the attraction magnet 162. In the present example embodiment, the thrust plate 163 is arranged to have a thickness smaller than that of the tubular portion 166. Note that the thrust plate 163 is arranged to have a thickness that allows magnetic flux from the upper surface 1621 of the attraction magnet 162 to pass through the thrust plate 163 to attract the lower end portion of the shaft 12. In addition, the upper surface 1621 of the attraction magnet 162 is arranged axially opposite to the lower surface convex portion 122 of the shaft 12 with the thrust plate 163 therebetween.

Thus, the lower surface of the shaft 12 is attracted by the magnetic force of the attraction magnet 162 to be in contact with the thrust plate 163. That is, the shaft 12 is attracted axially downward. At this time, the lower surface convex portion 122 of the shaft 12 is arranged lower than an upper surface of the flange portion 167. That is, an outer circumferential surface of the shaft 12 is arranged radially opposite to an inner circumferential surface of the tubular portion 166. Thus, magnetic flux from the attraction magnet 162 passes to a lower end surface of the shaft 12 through the tubular portion 166. This leads to an increase in attraction generated by the attraction magnet 162 to attract the shaft 12 downward. As a result, an increase in operating efficiency of the motor 10 can be achieved because the shaft 12 is restrained from being lifted upward by a buoyancy while the motor 10 is running.

In addition, the shaft 12 is arranged to rotate with the lower surface thereof being in contact with the thrust plate 163 by being attracted by the attraction magnet 162. Note that the thrust plate 163 may be made of a magnetic material. In this case, an increase in force caused by the magnetic force of the attraction magnet 162 to attract the shaft 12 can be achieved.

In the tip holder 161, the flange portion 167 is fixed in an interior of the housing 112. The base portion 11 is a casting made of a resin, and the housing 112 is also molded of the resin. Thus, the flange portion 167 is covered by the resin of the housing 112.

An insert molding process, for example, may be adopted as a method for arranging the flange portion 167 in an interior of the resin. In this case, the tip holder 161 is attached to a mold for molding the base portion 11. Then, the resin is filled into a space in which at least the flange portion 167 of the tip holder 161 is arranged. The resin filled thereinto is hardened to mold the base portion 11. Thus, the tip holder 161 is fixed to the housing 112. In the above-described manner, the tip holder 161 can be fixed to the housing 112 and be fixed with respect to the base portion 11 by a single resin molding process. The tip holder 161 can be easily fixed with respect to the housing 112, and thus, the motor 10 can be easily manufactured.

Note that, although the whole flange portion 167 of the tip holder 161 is covered by the resin in the present example embodiment, only a portion of the flange portion 167 may alternatively be covered by the resin when firm fixing is achievable. Also note that not only the flange portion 167 but also outer surfaces of the bottom portion 165 and the tubular portion 166 may be covered by the resin. Also note that, although the flange portion 167 of the tip holder 161 is in the shape of a circular ring, i.e., has a circular external shape, when viewed in the axial direction, the flange portion 167 may not necessarily be in such a shape. For example, the flange portion 167 may alternatively be in the shape of an ellipse, a square, or a polygon, such as a rhombus.

Provision of the magnetic attraction portion 16 as described above facilitates assembly of the motor 10. In addition, the tubular portion 166 serves as the back yoke for the attraction magnet 162. This leads to an increase in the attraction generated by the attraction magnet 162 to attract the shaft 12 downward. As a result, an increase in the operating efficiency of the motor 10 can be achieved because the shaft 12 is restrained from being lifted upward by a buoyancy while the motor 10 is running.

Figure 7:
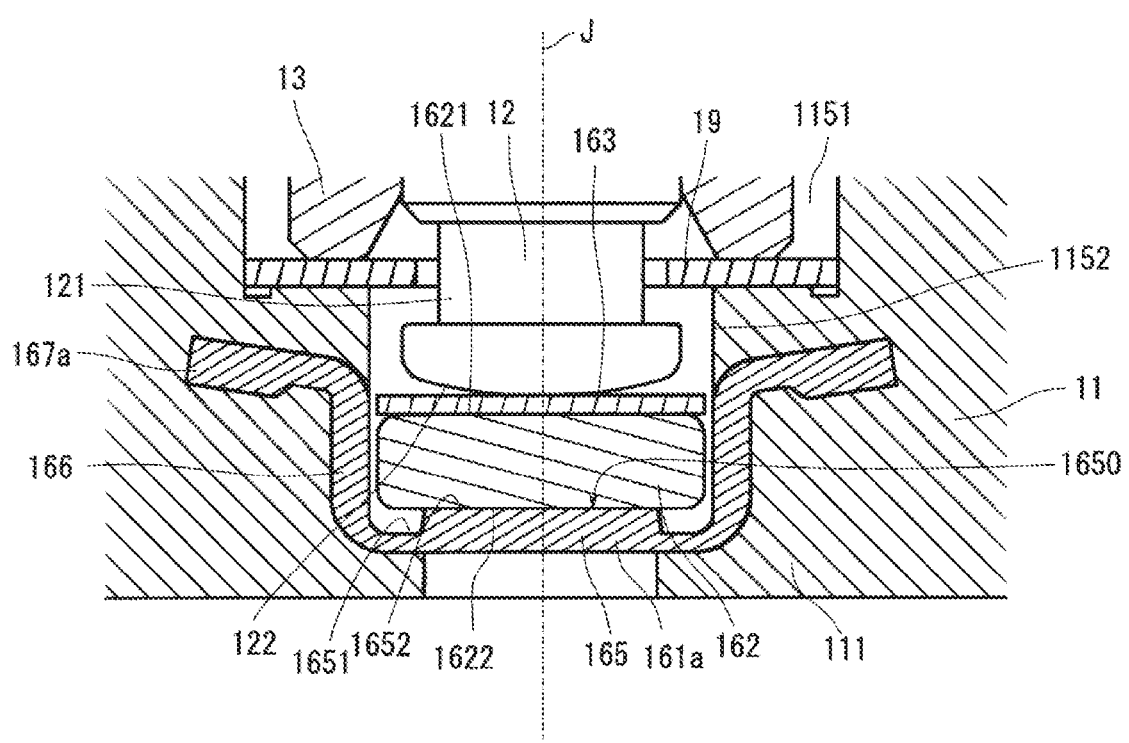
FIG. 7 is an enlarged sectional view of a magnetic attraction portion according to a modification of the above example embodiment of the present disclosure.

FIG. 7 is an enlarged sectional view of a magnetic attraction portion according to a modification of the present example embodiment of the present disclosure. A tip holder 161a of the magnetic attraction portion illustrated in FIG. 7 is different from the tip holder 161 in that the shape of a flange portion 167a is different from the shape of the flange portion 167. The tip holder 161a is otherwise identical in structure to the tip holder 161. Accordingly, portions of the tip holder 161a which have their equivalents in the tip holder 161 are denoted by the same reference numerals as those of their equivalents in the tip holder 161, and detailed descriptions of such portions will be omitted.

The posture of a thrust plate 163 and the posture of a shaft 12 are in accord with the posture of an attraction magnet 162 with respect to directions perpendicular to the central axis J. As illustrated in FIG. 7, in the tip holder 161a, the flange portion 167a is not in contact with a main body of the shaft 12. In addition, the flange portion 167a is not in contact with either the attraction magnet 162 or the thrust plate 163, which is in direct contact with the shaft 12. Accordingly, unlike an inclination of a second surface 1652 of a bottom portion 165, with which a lower surface 1622 of the attraction magnet 162 is in contact, an inclination of the flange portion 167a with respect to the directions perpendicular to the central axis J does not affect the posture of the shaft 12 when the shaft 12 is rotating. Therefore, the flange portion 167a may not be in parallel with the directions perpendicular to the central axis J. As illustrated in FIG. 7, in the present modification, the flange portion 167a is angled with respect to the second surface 1652 of the bottom portion 165.

Similarly to the tip holder 161 described above, the tip holder 161a is produced by subjecting a metal sheet to press working. As suggested above, in the tip holder 161a, the angle of the flange portion 167a with respect to the directions perpendicular to the central axis J is not required to be so precise as the angle of the second surface 1652 with respect thereto. This makes it easier to produce the tip holder 161a.

As illustrated in FIG. 7, the flange portion 167a of the tip holder 161a may be so shaped as to extend upward as it extends radially outward. In other words, the flange portion 167a may be arranged to slant upward as it extends radially outward. This shape of the flange portion 167a permits the bend angle of the flange portion 167a at the time of the press working to be smaller than in the case where the flange portion 167a is arranged to be in parallel with the second surface 1652 of the bottom portion 165. This leads to a reduction in a stress concentrated on a junction of the flange portion 167a with a tubular portion 166. For example, when the flange portion 167a is fixed to a housing 112 through an insert molding process, a residual stress accumulated in the flange portion 167a of the tip holder 161a may sometimes be released due to a temperature or another condition. Even if this happens, a stress that will act on the housing 112 will be relatively small, because the residual stress accumulated in the flange portion 167a is relatively small.

Figure 8:
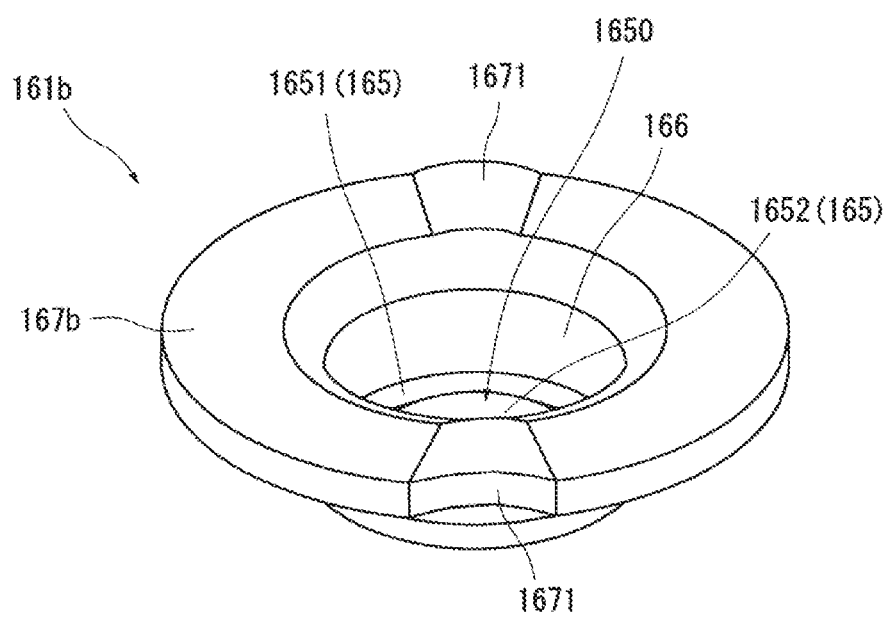
FIG. 8 is a perspective view of a magnetic attraction portion according to another modification of the above example embodiment of the present disclosure.

FIG. 8 is a perspective view of a magnetic attraction portion according to another modification of the present example embodiment of the present disclosure. A tip holder 161b of the magnetic attraction portion illustrated in FIG. 8 is different from the tip holder 161 in that the shape of a flange portion 167b is different from the shape of the flange portion 167. The tip holder 161b is otherwise identical in structure to the tip holder 161. Accordingly, portions of the tip holder 161b which have their equivalents in the tip holder 161 are denoted by the same reference numerals as those of their equivalents in the tip holder 161, and detailed descriptions of such portions will be omitted.

The flange portion 167b of the tip holder 161b illustrated in FIG. 8 includes flange projecting portions 1671 each of which is different in axial positions from circumferentially adjacent portions of the flange portion 167b. An upper surface of each flange projecting portion 1671 is arranged to project in the axial direction relative to a remaining portion of an upper surface of the flange portion 167b. In addition, a lower surface of each flange projecting portion 1671 is recessed in the axial direction relative to a remaining portion of a lower surface of the flange portion 167b. The flange portion 167b is arranged to twist in the circumferential direction due to provision of the flange projecting portions 1671.

When the flange portion 167b has been arranged in a resin of a housing 112, the tip holder 161b is restrained from moving in the circumferential direction as each flange projecting portion 1671 provides resistance. Note that, although each flange projecting portion 1671 is depicted as protruding upward in FIG. 8, this is not essential to the present disclosure. For example, the flange portion 167b may alternatively include a downwardly protruding portion as a flange projecting portion 1671. Also note that the flange portion 167b may alternatively be so shaped as to include upwardly protruding portions and downwardly protruding portions arranged alternately in a periodic manner. Also note that the flange portion 167b may alternatively be arranged to have an irregular, uneven surface. Also note that the flange portion 167b may alternatively be arranged to have a relatively thick portion(s) and a relatively thin portion(s) combined to provide a twist in each of the upper surface and the lower surface of the flange portion 167b. That is, at least a portion of at least one of the upper surface and the lower surface of the flange portion 167b is arranged to have a twist in the circumferential direction.

Figure 9:
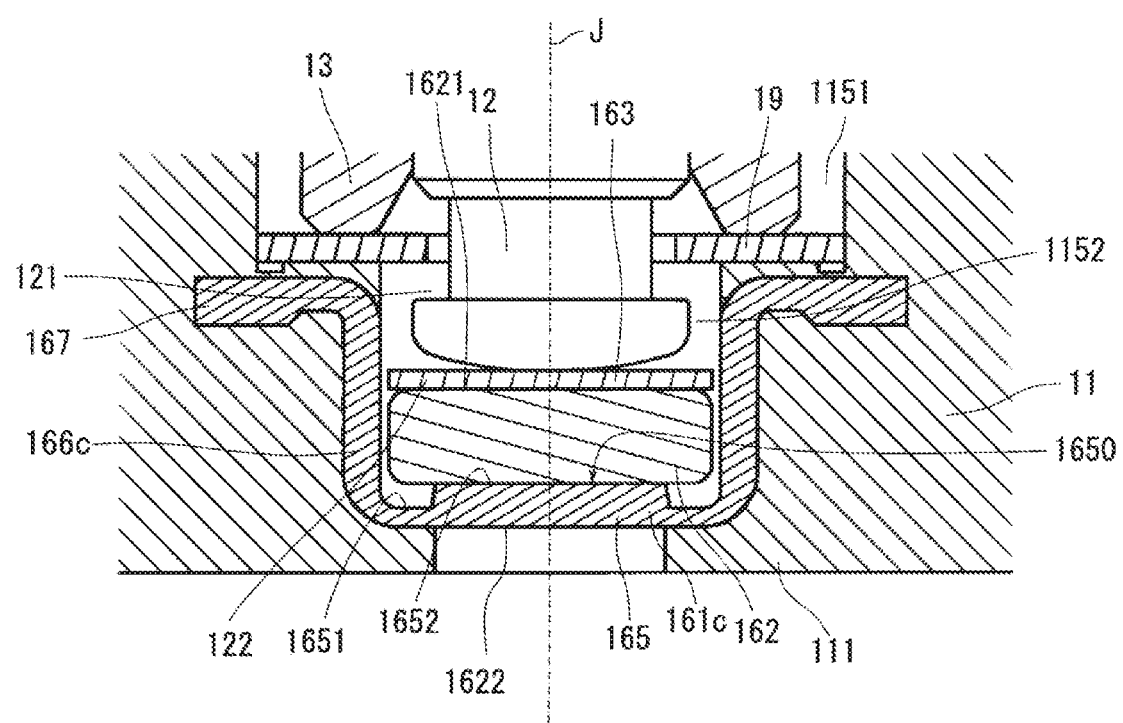
FIG. 9 is an enlarged sectional view of a magnetic attraction portion according to yet another modification of the above example embodiment of the present disclosure.

FIG. 9 is an enlarged sectional view of a magnetic attraction portion according to yet another modification of the present example embodiment of the present disclosure. An inner surface of a tubular portion 166c of a tip holder 161c of the magnetic attraction portion illustrated in FIG. 9 is opposed to a radially outer surface of a lower end portion of a shaft 12. The tip holder 161c is otherwise identical in structure to the tip holder 161. Accordingly, portions of the tip holder 161c which have their equivalents in the tip holder 161 are denoted by the same reference numerals as those of their equivalents in the tip holder 161, and detailed descriptions of such portions will be omitted.

Referring to FIG. 9, the inner surface of the tubular portion 166c of the tip holder 161c is radially opposed to an outer surface of the shaft 12 over the entire circumferential extent of the outer surface of the shaft 12. In other words, an outer circumferential surface of the shaft 12 is radially opposed to an inner circumferential surface of the tubular portion 166c over the entire circumferential extent of the inner circumferential surface of the tubular portion 166c with a gap therebetween. This arrangement contributes to preventing a contact between the shaft 12 and the tubular portion 166c during rotation. In addition, the tubular portion 166c is arranged to have an axial dimension greater than that of the tubular portion 166 to increase the area of contact between the tip holder 161c and a resin of a base portion 11, so that the tip holder 161c can be firmly fixed to the base portion 11.

Figure 10:
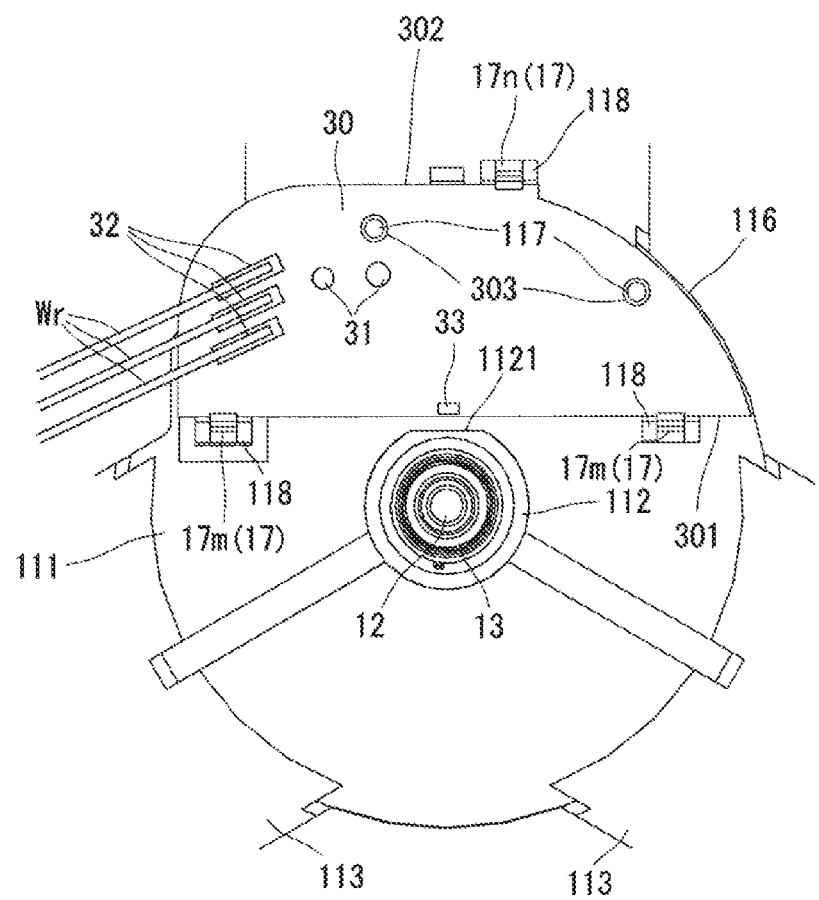
FIG. 10 is a plan view of a base portion according to an example embodiment of the present disclosure with a circuit board attached thereto.
Figure 11:
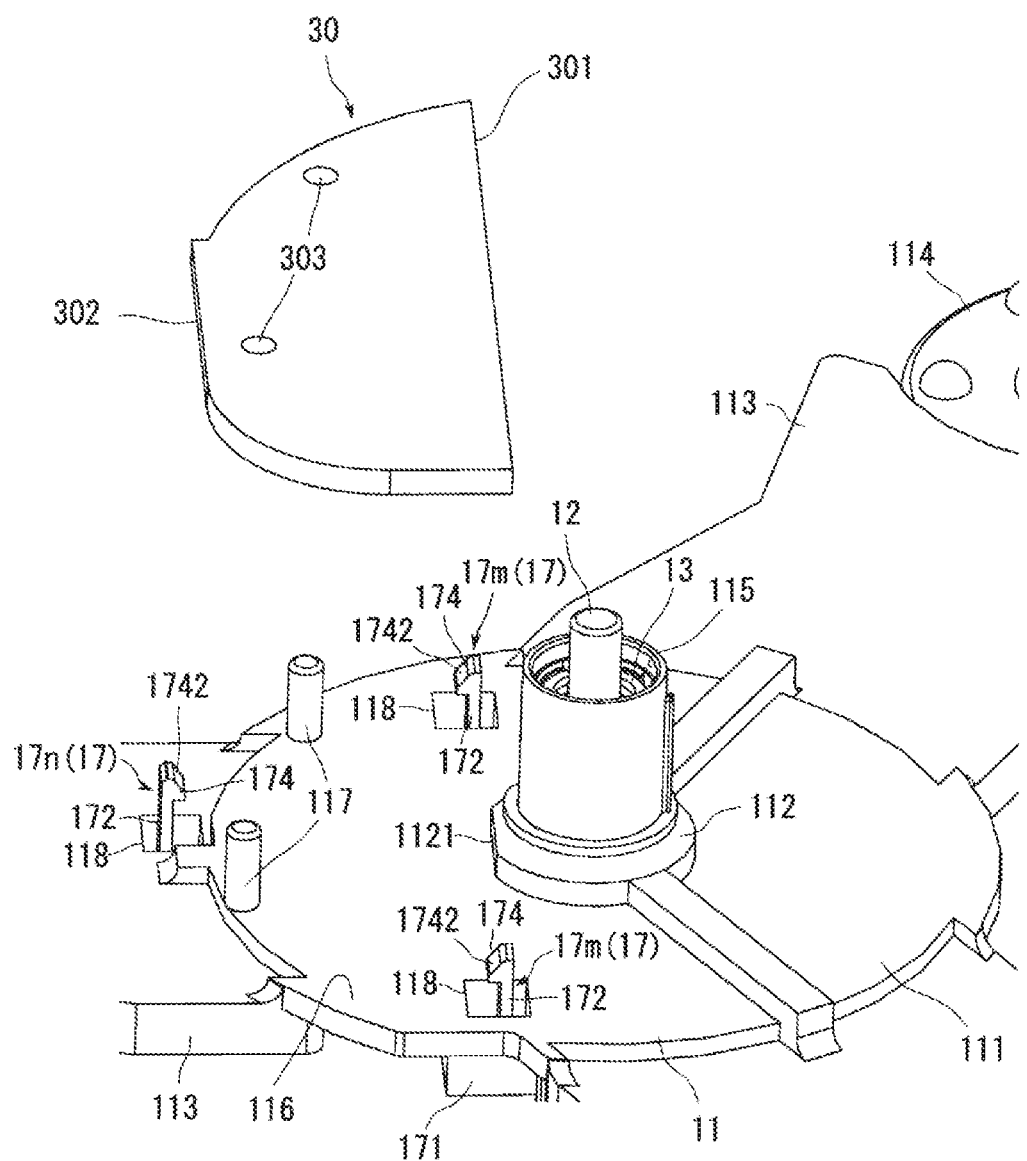
FIG. 11 is an enlarged perspective view of the base portion with the circuit board removed therefrom.
Figure 12:
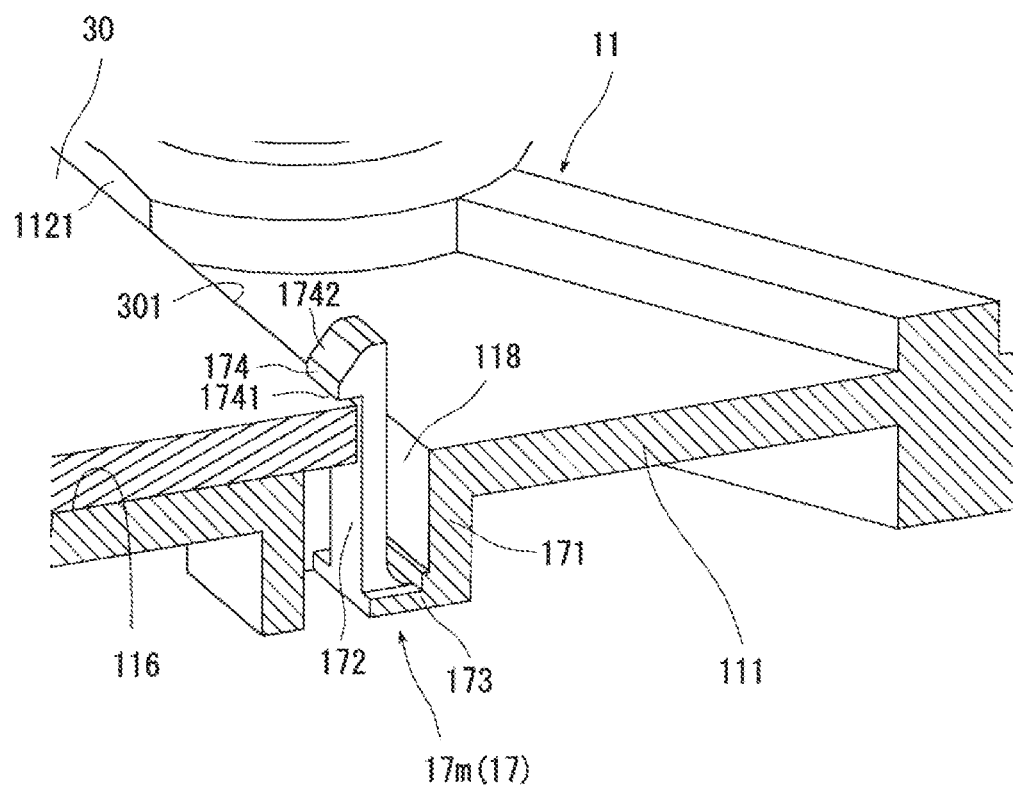
FIG. 12 is a perspective sectional view illustrating a board holding portion and its vicinity according to an example embodiment of the present disclosure in an enlarged form.

The base portion 11 includes a plurality of board holding portions 17. The circuit board 30 is held by the board holding portions 17. That is, the circuit board 30 is arranged below the stator 14. Here, the circuit board 30 and the board holding portions 17 will now be described in detail below with reference to the accompanying drawings. FIG. 10 is a plan view of the base portion 11 with the circuit board 30 attached thereto. FIG. 11 is an enlarged perspective view of the base portion 11 with the circuit board 30 removed therefrom. FIG. 12 is a perspective sectional view illustrating one of the board holding portions 17 and its vicinity in an enlarged form.

As illustrated in FIG. 10, the circuit board 30 is held by the board holding portions 17, which are provided on the plate portion 111 of the base portion 11. The circuit board 30 is arranged on a board mounting portion 116, which is a region radially outward of the housing 112 in the plate portion 111. A portion of the housing 112 which is adjacent to the board mounting portion 116 includes a cut surface 1121, which has been made flat or substantially flat by being cut. The cut surface 1121 is a surface perpendicular to a radial direction.

Here, the circuit board 30 will now be described below. The circuit board 30 includes an inside flat surface 301 and an outside flat surface 302. Each of the inside flat surface 301 and the outside flat surface 302 is a flat surface, and each of the inside flat surface 301 and the outside flat surface 302 is arranged to extend in a direction perpendicular to the radial direction. When the circuit board 30 has been mounted on the board mounting portion 116, the inside flat surface 301 is a side surface on a side on which the central axis J lies, and is radially opposed to the cut surface 1121 of the housing 112. When the circuit board 30 is arranged on the board mounting portion 116, the inside flat surface 301 is moved along the cut surface 1121. This makes it easier to attach the circuit board 30 to the board holding portions 17. In addition, it is made possible to arrange the circuit board closer to the central axis J. Meanwhile, the outside flat surface 302 is a side surface of the circuit board 30 on a side away from the central axis J. In the present example embodiment, the inside flat surface 301 and the outside flat surface 302 are arranged to be parallel to each other. In a plan view, the dimension of the inside flat surface 301 in a direction perpendicular to the central axis J is arranged to be greater than that of the outside flat surface 302. In addition, the inside flat surface 301 and the outside flat surface 302 are joined to each other by curved surfaces.

The circuit board 30 includes board through holes 303 each of which is arranged to pass therethrough in the axial direction. The number of board through holes 303 included in the circuit board 30 is two. The base portion 11 includes a plurality of bosses 117 each of which is arranged to extend upward from an upper surface thereof. The number of bosses 117 included in the base portion 11 is two. Each boss 117 is arranged to pass through a separate one of the board through holes 303. Thus, the circuit board 30 is restrained from moving in the circumferential direction or in any radial direction. Note that it is preferable that each of the number of board through holes 303 and the number of bosses 117 is two or more to restrain the circuit board 30 from moving in the circumferential direction or in any radial direction.

Referring to FIG. 10, connection portions 31, external connection portions 32, and a sensing portion 33 are arranged on an upper surface of the circuit board 30. That is, the circuit board 30 includes a connection portion. In addition, the circuit board 30 includes a wiring pattern formed by an electrically conductive material, such as, for example, aluminum or copper. Each of the connection portions 31 and the external connection portions 32 is a portion of the wiring pattern. That is, each of the connection portions 31 and the external connection portions 32 is a connection terminal. Drawn-out wires 146 (see FIG. 17, etc., which will be referred to below) drawn out from coils 143, which will be described below, are connected to the connection portions 31. That is, the drawn-out wires 146 are connected to the connection portions 31. The connection between the connection portions 31 and the drawn-out wires 146 enables an electric current to be passed from a drive circuit to the coils 143.

A lead wire Wr used for connection with an external device, such as, for example, an external power supply, is connected to each external connection portion 32. The lead wire Wr connected to the external connection portion 32 is drawn out to an outside after being caught on the corresponding lead wire leading portion 1131. The sensing portion 33 includes a sensor mounted on the upper surface of the circuit board 30, and is arranged to sense rotation of the rotor 15. Examples of sensors that can be used to sense the rotation of the rotor 15 include, for example, a Hall element. The sensing portion 33 is preferably arranged in the vicinity of the rotor 15. Thus, the sensing portion 33 is arranged radially inward, i.e., on a side on which the inside flat surface 301 lies, on the circuit board 30.

The circuit board 30 is held by the board holding portions 17 after being arranged on the board mounting portion 116 of the plate portion 111. The circuit board 30 is thus fixed with respect to the board mounting portion 116. Next, the board holding portions 17 will now be described below.

Referring to FIGS. 10 to 12, each board holding portion includes a first extension portion 171, a second extension portion 172, a joining portion 173, and a claw portion 174. The board holding portion 17 is included in the base portion 11, and is made of the same material as that of the base portion 11.

The first extension portion 171 is arranged to extend downward from a lower surface of the base portion 11. The base portion 11 includes base through holes 118 each of which is arranged to pass through the base portion 11 in the vertical direction. Each base through hole 118 is rectangular when viewed in the axial direction. In addition, the first extension portion 171 is arranged to extend downward from edge portions of all four sides of the rectangular base through hole 118 to assume the shape of a tube that is rectangular in a cross-section. The tubular shape of the first extension portion 171 leads to increased strength of the first extension portion 171. Note that, if the first extension portion 171 is able to achieve a sufficient strength, the first extension portion 171 may not necessarily be tubular, and may alternatively be, for example, in the form of a wall extending axially downward from the edge portion of one side of the base through hole 118.

The second extension portion 172 is arranged to extend upward from below the base portion 11 in the corresponding base through hole 118, and is arranged opposite to the first extension portion 171 with a gap therebetween. The second extension portion 172 is arranged to extend upward from below through the corresponding base through hole 118.

The joining portion 173 is arranged to join a lower portion of the first extension portion 171 and a lower portion of the second extension portion 172 to each other. An increase in axial dimension of the second extension portion 172 can be achieved by once extending the first extension portion 171 downward and then joining the first extension portion 171 to the second extension portion 172 through the joining portion 173 at a distal end of the first extension portion 171. This arrangement contributes to preventing an increase in angle at which the second extension portion 172 is deformed at the time of the attachment of the circuit board 30, and reducing a stress concentration on the second extension portion 172. For example, even in the case where the circuit board 30 has a large thickness, it is not necessary to increase the distance from the upper surface of the base portion 11 to an upper end of the claw portion 174 since the first extension portion 171 is once extended downward from the base portion 11. Thus, the board holding portions 17 are able to stably hold the circuit board 30 while an increase in the size of the motor 10 is prevented or minimized.

In a longitudinal direction of the base through hole 118, the dimension of the second extension portion 172 is smaller than the dimension of the joining portion 173. That is, the width of the second extension portion 172 is smaller than the width of the joining portion 173. Thus, the second extension portion 172 tends to become more easily deformed than the joining portion 173. The joining portion 173 is joined to three sides of the first extension portion 171, but this is not essential to the present disclosure. It may be sufficient if the joining portion 173 is joined to at least a portion of the first extension portion 171. In the board holding portion 17, the joining portion 173 is arranged to project from a wall portion defining a long side of the first extension portion 171, and is joined to wall portions adjacent to the wall portion. That is, the joining portion 173 is joined to one long side of the first extension portion 171 and short sides of the first extension portion 171 on both sides of the one long side. Thus, an increase in the strength of each of the first extension portion 171 and the joining portion 173 can be achieved.

The claw portion 174 is arranged to extend from an upper end of the second extension portion 172 in a direction that is not parallel to the central axis J. Note that, although the claw portion 174 is arranged to extend from the upper end of the second extension portion 172 in a direction away from the joining portion 173 in the present example embodiment, this is not essential to the present disclosure. For example, the claw portion 174 may alternatively be arranged to extend from the upper end of the second extension portion 172 to a side on which the joining portion 173 lies. The claw portion 174 includes a claw portion lower surface 1741 and a claw portion upper surface 1742. The claw portion lower surface 1741 is a lower surface of the claw portion 174, and is arranged to be in contact with the upper surface of the circuit board 30. That is, at least a portion of the lower surface of the claw portion 174 is arranged to be in contact with the upper surface of the circuit board 30. The claw portion lower surface 1741 is not parallel to the central axis J. The claw portion lower surface 1741 is arranged at a level higher than that of an upper surface of the board mounting portion 116 by the thickness of the circuit board 30. Note that, although the claw portion lower surface 1741 of the claw portion 174 is arranged to be perpendicular to the central axis J in the present example embodiment, this is not essential to the present disclosure. Also note that the claw portion lower surface 1741 may alternatively be arranged at a level higher than that of the upper surface of the board mounting portion 116 by more than the thickness of the circuit board 30. This arrangement will provide an extra space between the circuit board 30 and the claw portion lower surface 1741, facilitating the attachment of the circuit board 30.

The claw portion upper surface 1742 is an upper surface of the claw portion 174, and is arranged at a level higher than that of the claw portion lower surface 1741. In addition, the claw portion upper surface 1742 is arranged to slant downward as it extends away from the first extension portion 171.

In addition, as illustrated in FIG. 10, the base portion 11 includes three of the board holding portions 17. Two of the three board holding portions 17 are arranged to hold the circuit board 30 on the side on which the inside flat surface 301 lies, while the remaining one of the three board holding portions 17 is arranged to hold the circuit board 30 on the side on which the outside flat surface 302 lies. Each of the board holding portions 17 which are arranged to hold the circuit board 30 on the side on which the inside flat surface 301 lies will be hereinafter referred to as an inside board holding portion 17m as necessary, while the board holding portion 17 which is arranged to hold the circuit board 30 on the side on which the outside flat surface 302 lies will be hereinafter referred to as an outside board holding portion 17n as necessary.

In addition, a side surface of each inside board holding portion 17m from which the claw portion 174 extends is arranged opposite to the inside flat surface 301 in a direction that is not parallel to the central axis J. Meanwhile, a side surface of the second extension portion 172 of the outside board holding portion 17n from which the claw portion 174 extends is arranged opposite to the outside flat surface 302 in a direction that is not parallel to the central axis J.

The circuit board 30 is restrained from moving in a direction away from the central axis J as a result of the circuit board 30 being held by the two inside board holding portions 17m on the side on which the inside flat surface 301 lies and being held by the outside board holding portion 17n on the side on which the outside flat surface 302 lies.

Next, the mounting of the circuit board 30 onto the board mounting portion 116 will now be described below. The bosses 117 are passed through the board through holes 303 of the circuit board 30. As a result, the circuit board 30 is positioned both circumferentially and radially with respect to the board mounting portion 116. Then, the circuit board 30 is moved downward to bring the claw portion upper surface 1742 of each inside board holding portion 17m into contact with a lower edge portion of the inside flat surface 301. In addition, the claw portion upper surface 1742 of the outside board holding portion 17n is brought into contact with a lower edge portion of the outside flat surface 302. When the circuit board 30 is moved further downward, the claw portion upper surface 1742 of each inside board holding portion 17m is pressed by the inside flat surface 301, so that the second extension portion 172 is elastically deformed toward the first extension portion 171. In addition, the claw portion upper surface 1742 of the outside board holding portion 17n is pressed by the outside flat surface 302, so that the second extension portion 172 is elastically deformed toward the first extension portion 171.

Then, when a lower surface of the circuit board 30 has been brought into contact with the upper surface of the board mounting portion 116, the claw portion 174 of each of the inside board holding portions 17m and the outside board holding portion 17n lies above the upper surface of the circuit board 30. As a result, the second extension portions 172, which have been elastically deformed, return to their original positions, and the claw portion lower surface 1741 of each claw portion 174 is brought into contact with the upper surface of the circuit board 30. Thus, the circuit board 30 is restrained from moving upward by the inside board holding portions 17m and the outside board holding portion 17n.

Once the circuit board 30 is mounted on the board mounting portion 116, the circuit board 30 is restrained from moving axially, radially, or circumferentially. In this condition, the drawn-out wires 146 (see FIG. 17, which will be referred to below) are fixed to the corresponding connection portions 31, and the lead wires Wr are fixed to the corresponding external connection portions 32.

The lead wires Wr connected to the corresponding external connection portions 32 are connected to the external device, such as, for example, the external power supply. If each lead wire Wr can become loose, the distance between the lead wire Wr and the rotor 15 needs to be large enough to prevent a contact between the lead wire Wr and the rotor 15. However, an increase in the distance between each lead wire Wr and the rotor 15 leads to an increased size of the motor 10. To reduce the size of the motor 10, it is preferable that each lead wire Wr is drawn out with a certain tension acting on the lead wire Wr. In the present example embodiment, each lead wire Wr is drawn out while being caught on the corresponding lead wire leading portion 1131. Accordingly, when the lead wire Wr is drawn out, the circuit board 30 is pulled in a direction in which the lead wire Wr extends. In the present example embodiment, the direction in which each external connection portion 32 is arranged to extend, that is, the direction in which each lead wire Wr is arranged to extend, is arranged to be a direction that is not parallel to either the direction in which the claw portion 174 of each inside board holding portion 17m extends or the direction in which the claw portion 174 of the outside board holding portion 17n extends. The above arrangement of the external connection portions 32 contributes to preventing the pulling of the circuit board 30 by any lead wire Wr from causing a deformation of the second extension portion 172 of any of the inside board holding portions 17m and the outside board holding portion 17n. Thus, the circuit board 30 can be firmly held by the inside board holding portions 17m and the outside board holding portion 17n.

Note that, although the board mounting portion 116 is provided with the two inside board holding portions 17m and the one outside board holding portion 17n, this is not essential to the present disclosure. The board mounting portion 116 may alternatively be provided with more than three board holding portions 17, for example. In addition, the board mounting portion 116 may alternatively be provided with only one board holding portion 17 when a high positioning precision is achieved by the bosses 117, because the circuit board 30 does not easily become unsteady in this case. In this case, the one board holding portion 17 may be arranged either on the side on which the inside flat surface 301 lies or on the side on which the outside flat surface 302 lies. The one board holding portion 17 may alternatively be arranged to hold a portion of the circuit board 30 which is in the vicinity of a side surface other than the inside flat surface 301 and the outside flat surface 302. In this case, it is preferable that the side surface opposite to the board holding portion 17 is a flat surface.

The structure of the rotor 15 will now be described below. The rotor 15 includes the rotor magnet 151 and the magnet holder 152. The rotor magnet 151 is cylindrical, and includes north pole surfaces and south pole surfaces arranged alternately in the circumferential direction. The rotor magnet 151 may be defined by, for example, a tubular body molded in one piece of a resin containing magnetic powder, and including north poles and south poles arranged to alternate with each other in the circumferential direction. The rotor magnet 151 may alternatively be made up of a plurality of magnet pieces. In this case, in the magnet, north poles and south poles are arranged alternately in the circumferential direction.

The magnet holder 152 is made of a magnetic material, and the rotor magnet 151 is fixed to an inner surface of the magnet holder 152. The magnet holder 152 includes a cover portion 153 and a holder tubular portion 154. The cover portion 153 is in the shape of a circular ring. The holder tubular portion 154 is arranged to extend downward from a radially outer edge of the cover portion 153. In addition, the magnet holder 152 is fixed to an inside of the hub tubular portion 223 of the impeller 20. The rotor magnet 151 is thus arranged to be coaxial with the central axis J.

Figure 13:
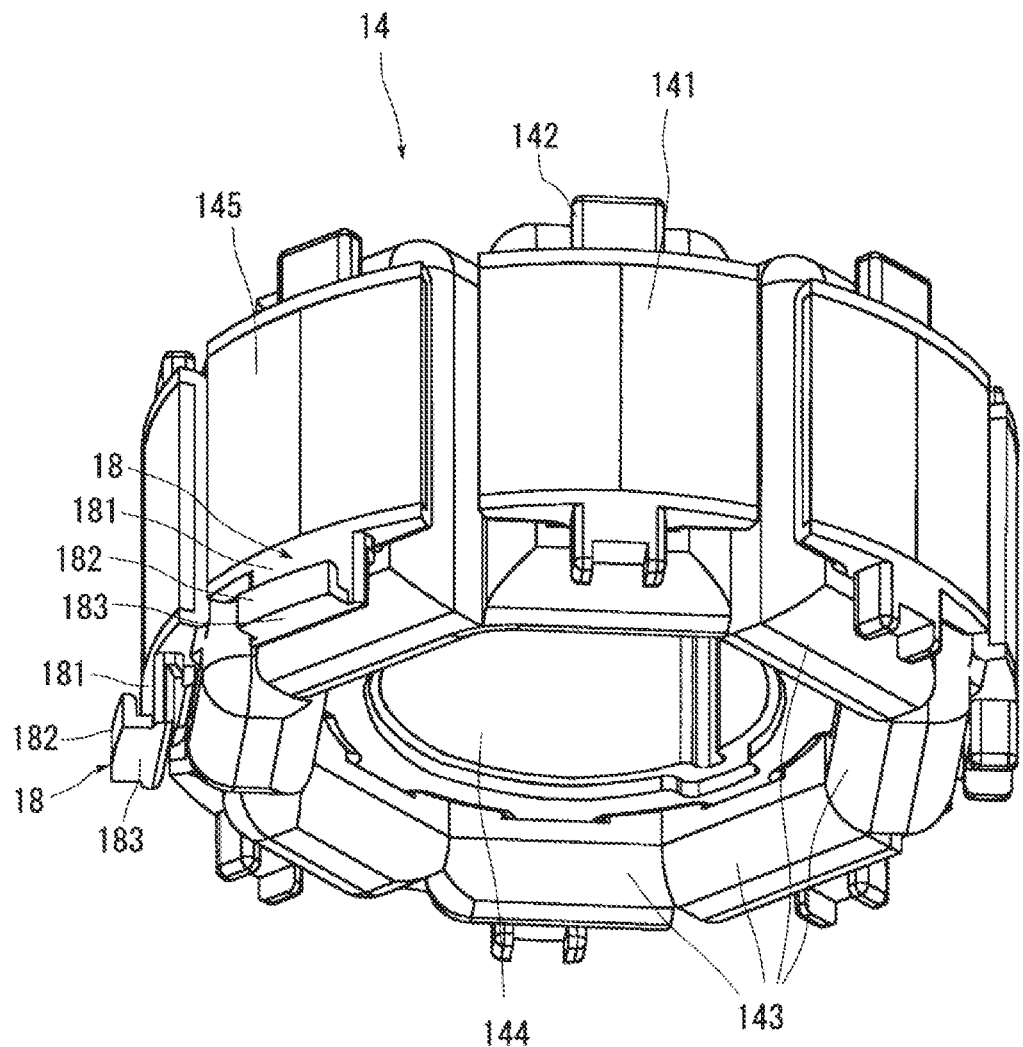
FIG. 13 is a perspective view of a stator according to an example embodiment of the present disclosure as viewed from below.
Figure 14:
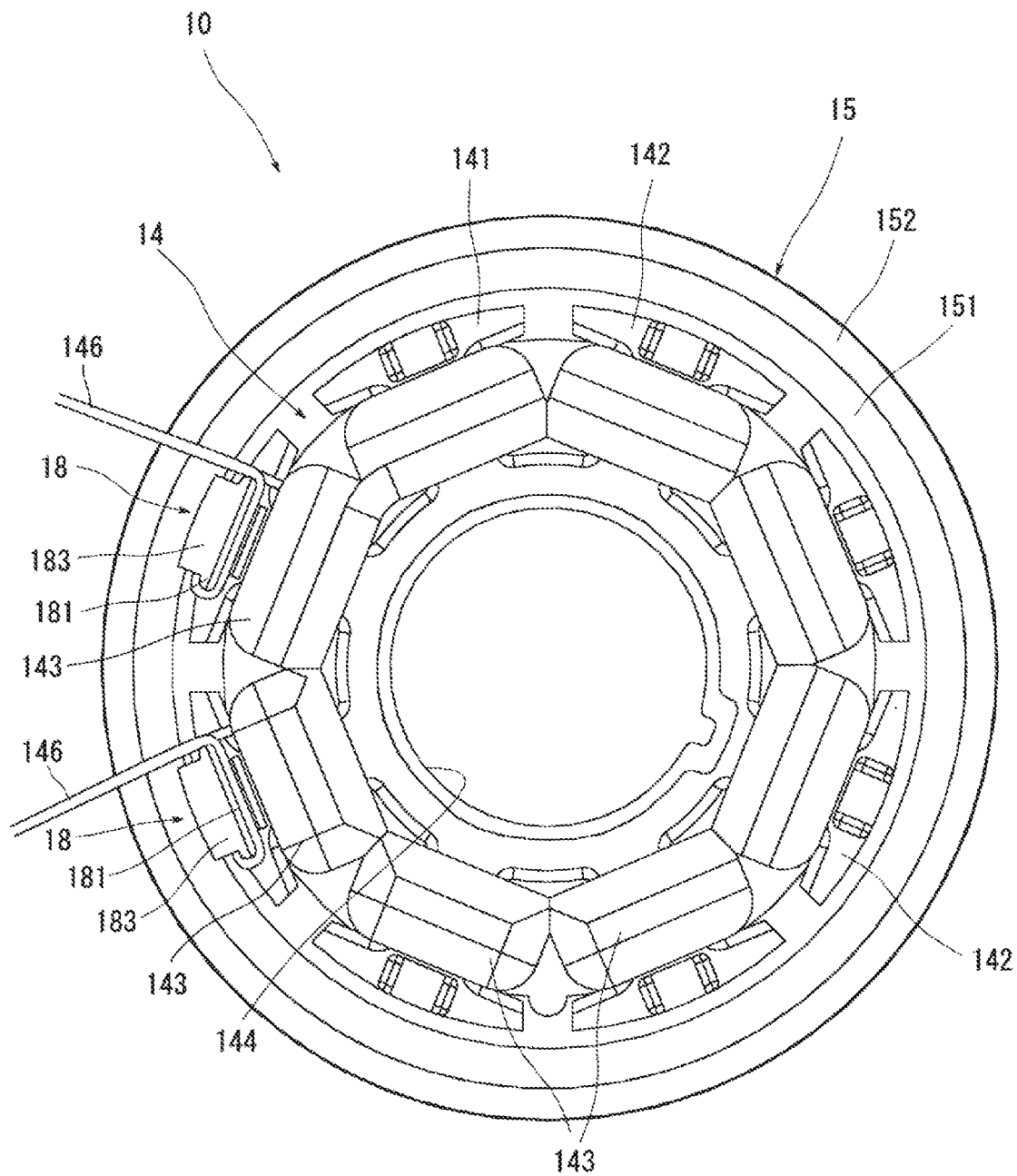
FIG. 14 is a bottom view of the stator illustrated in FIG. 13.

Next, the stator 14 will now be described in detail below. FIG. 13 is a perspective view of the stator 14 as viewed from below. FIG. 14 is a bottom view of the stator 14 illustrated in FIG. 13. As illustrated in FIG. 3 and so on, the stator 14 is fixed to the housing 112. As illustrated in FIGS. 13 and 14, the stator 14 includes a stator core 141, an insulator 142, and the coils 143. The stator core 141 is a laminated body defined by electromagnetic steel sheets placed one upon another in the axial direction (which is the vertical direction in FIG. 3). Note that the stator core 141 may not necessarily be the laminated body defined by the electromagnetic steel sheets placed one upon another, but may alternatively be defined by a single monolithic member made by sintering of powder, casting, or the like, for example.

The stator core 141 includes an annular core back 144 and a plurality of teeth 145. That is, the stator 14 includes the annular core back 144. The housing 112 is fixed to an inner surface of the annular core back 144. Note that it may be sufficient if the core back 144 and the housing 112 are relatively fixed to each other.

The teeth 145 are arranged to extend radially outward in a radial manner from an outer circumferential surface of the core back 144 toward the rotor magnet 151 of the rotor 15. That is, the teeth 145 are arranged to extend radially outward from the core back 144. The teeth 145 are thus arranged in the circumferential direction. That is, the teeth 145 are arranged to extend radially from the core back 144, and are arranged in the circumferential direction. Each coil 143 is defined by a conducting wire wound around a separate one of the teeth 145 with the insulator 142 therebetween.

The insulator 142 is made of, for example, a resin or the like, and is arranged to cover at least the teeth 145. The insulator 142 is arranged to provide isolation between the stator core 141, including the teeth 145, and the coils 143. That is, the insulator 142 is arranged to cover at least a portion of each of an upper surface, a lower surface, and circumferential side surfaces of each of the teeth 145. Note that the insulator 142 may not necessarily be made of a resin, and that a variety of materials that are able to provide isolation between the stator core 141 and the coils 143 can be widely adopted as the material of the insulator 142.

As described above, each coil 143 is defined by the conducting wire wound around a separate one of the teeth 145 with the insulator 142 therebetween. That is, each coil 143 is defined by the conducting wire wound around the corresponding tooth 145 with the insulator 142 therebetween. The conducting wire defining the coils 143 includes a winding start portion and a winding end portion. The winding start portion and the winding end portion of the conducting wire correspond to the drawn-out wires 146 drawn out from the coils 143. Each drawn-out wire 146 is connected to the corresponding connection portion 31 of the circuit board 30. That is, each drawn-out wire 146 is drawn out from the coils 143, and is electrically connected to the circuit board 30. The conducting wire is wound around some of the teeth 145 to define some of the coils 143. Thus, the stator 14 includes two of the drawn-out wires 146. In the present example embodiment, the motor is a single-phase motor, and therefore includes two of the drawn-out wires 146. Note, however, that this is not essential to the present disclosure. In the case where the motor 10 is a three-phase motor, for example, the motor 10 may include three of the drawn-out wires 146.

Each connection portion 31 is connected to the drive circuit (not shown) mounted on the circuit board 30, and the electric current is supplied from the drive circuit to the coils 143 through the drawn-out wires 146. The motor 10 is a brushless motor. The electric current is supplied to the coils 143 with predetermined timing to rotate the rotor 15 with each coil 143 attracting or repelling the rotor magnet 151. The stator 14 includes guide portions 18 each of which is arranged to guide one of the drawn-out wires 146 drawn out from the coils 143.

Figure 15:
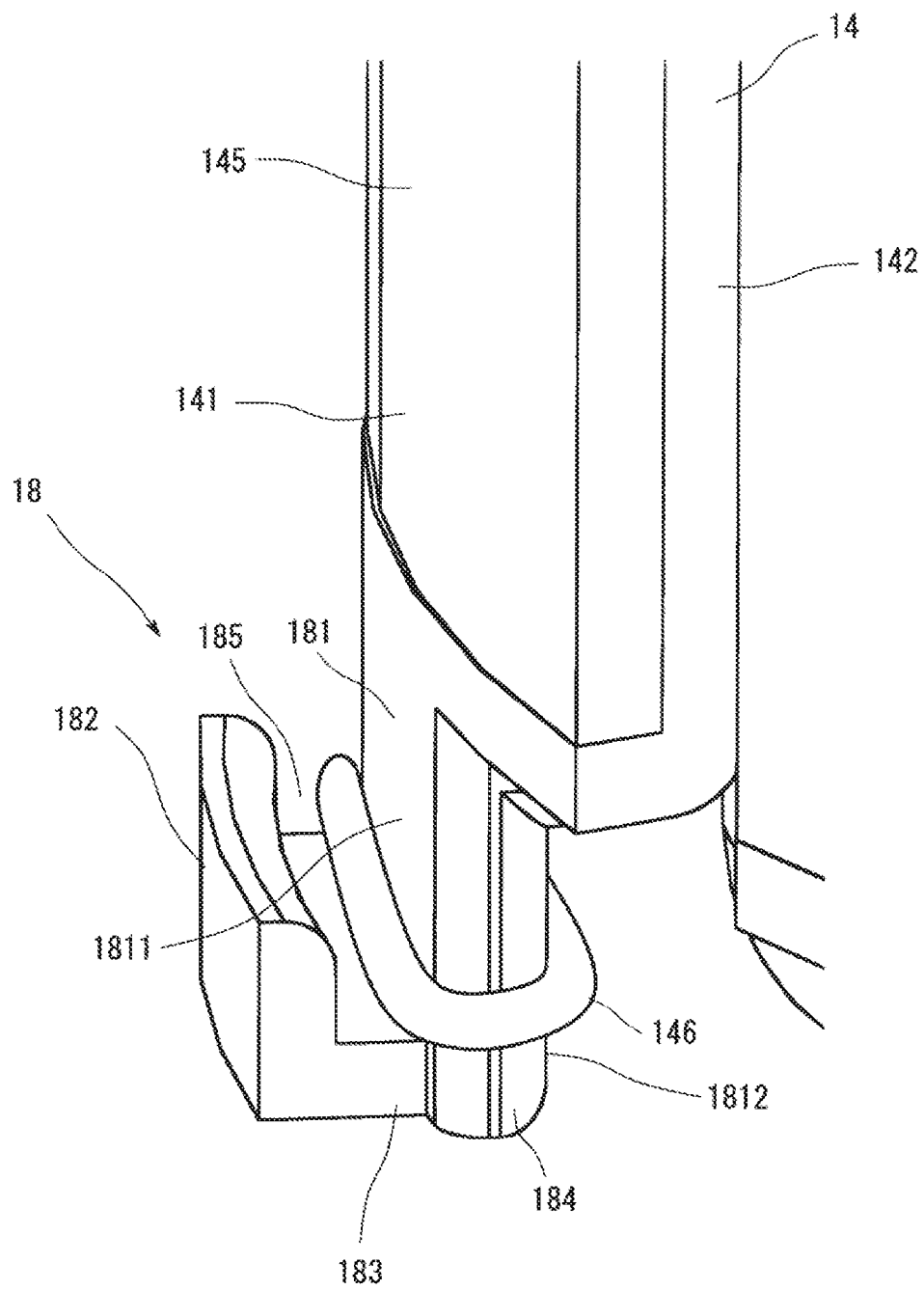
FIG. 15 is an enlarged perspective view of a guide portion according to an example embodiment of the present disclosure as viewed from above.
Figure 16:
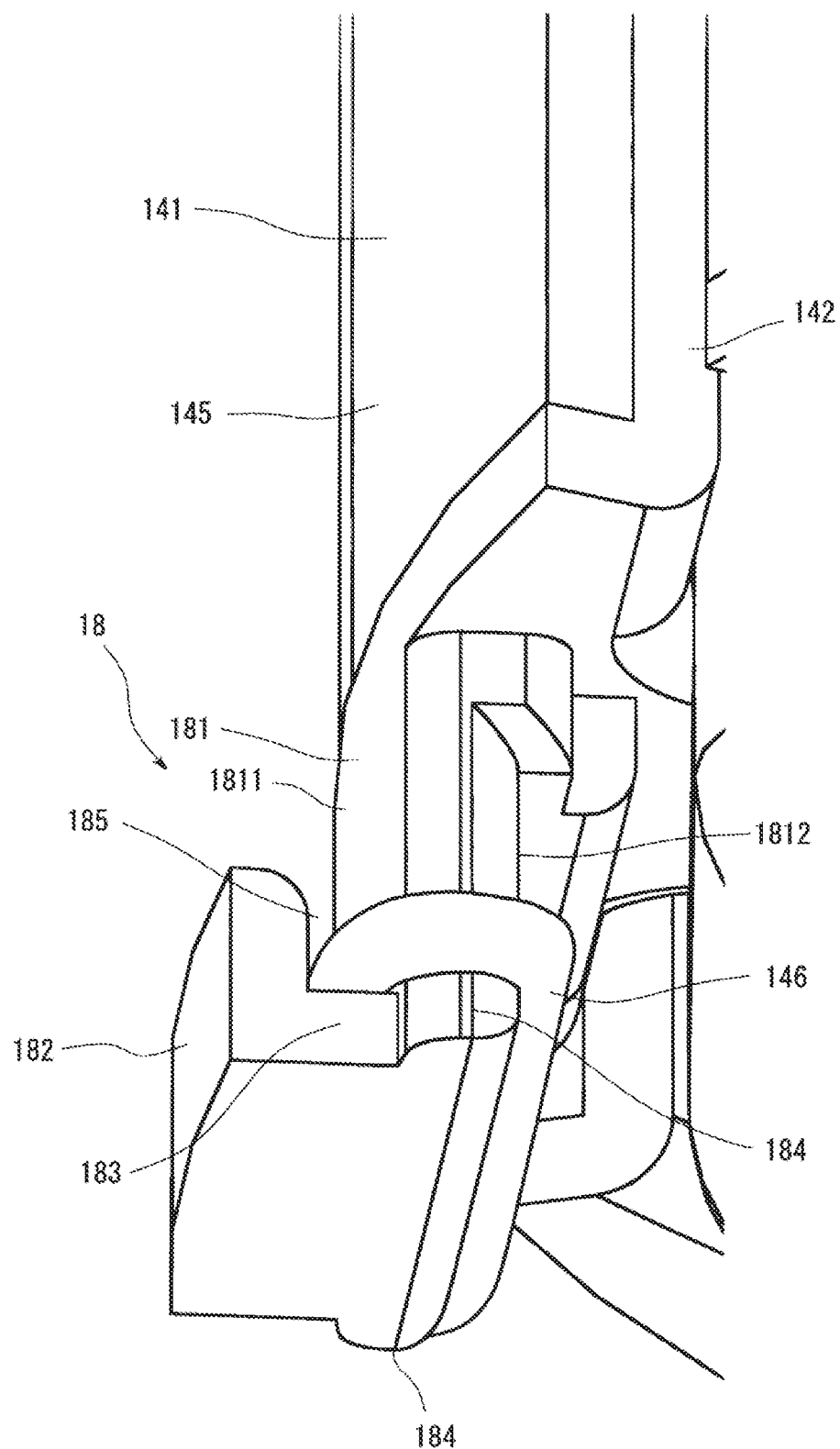
FIG. 16 is an enlarged perspective view of the guide portion as viewed from below.
Figure 17:
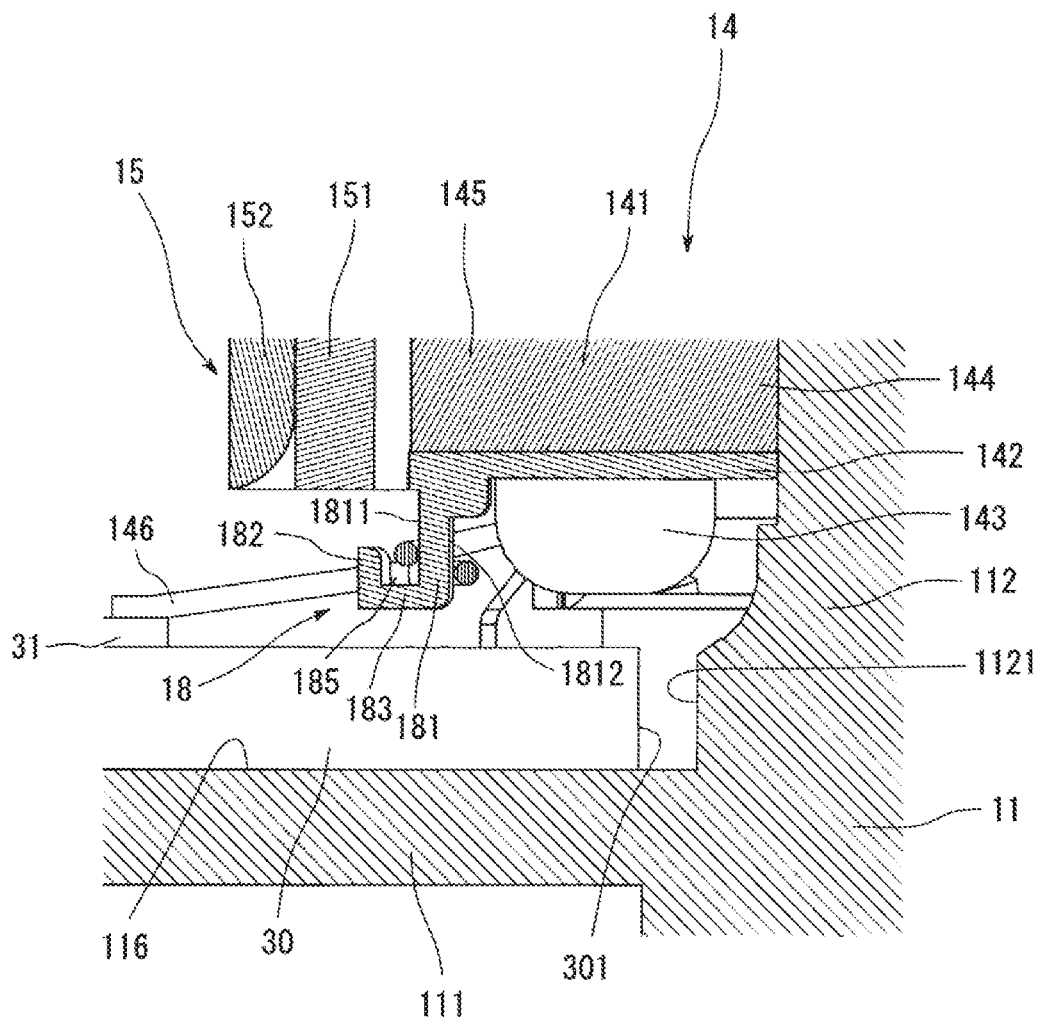
FIG. 17 is an enlarged sectional view of the base portion and the stator including the guide portion.

Next, the guide portion 18 will now be described in detail below with reference to the accompanying drawings. FIG. 15 is an enlarged perspective view of the guide portion 18 as viewed from above. FIG. 16 is an enlarged perspective view of the guide portion 18 as viewed from below. FIG. 17 is an enlarged sectional view of the base portion 11 and the stator 14 including the guide portions 18.

Referring to FIGS. 15, 16, and 17, each guide portion 18 is arranged below the insulator 142. The guide portion 18 is arranged radially outward of the coils 143. That is, the guide portion 18 is arranged radially outward of the coils 143 at a lower portion of the insulator 142. The guide portion 18 is made of the same material as that of the insulator 142. Each guide portion 18 includes a first wall portion 181, a second wall portion 182, and a bend portion 183. The first wall portion 181 is arranged to extend downward from a lower surface of the insulator 142. The first wall portion 181 is arranged to extend along the circumferential direction. The first wall portion 181 includes curved surfaces 184 at both circumferential ends thereof. The first wall portion 181 includes a radially outer surface 1811 and a radially inner surface 1812 smoothly joined to each other. In other words, each curved surface 184 is arranged to join the radially outer surface 1811 and the radially inner surface 1812 to each other in a differentiable manner. In addition, the curved surface 184 itself is differentiable. That is, the radially outer surface 1811 and the radially inner surface 1812 of the first wall portion 181 are joined to each other through the curved surfaces 184 at both circumferential end portions thereof.

The bend portion 183 is joined to a lower end portion of the first wall portion 181, and is arranged to extend radially outward therefrom. That is, the bend portion 183 is arranged to extend radially outward from the lower end portion of the first wall portion 181. Here, the bend portion 183 is arranged to be perpendicular to the central axis J. The bend portion 183 is arranged axially opposite to the base portion 11 and the circuit board 30 with a gap therebetween. The second wall portion 182 is joined to a radially outer edge of the bend portion 183, and is arranged to extend axially upward therefrom. The first wall portion 181 and the second wall portion 182 are arranged radially opposite to each other with a gap 185 therebetween. That is, the guide portion 18 includes the second wall portion 182, which is arranged to extend upward from the radially outer edge of the bend portion 183, and is arranged opposite to the first wall portion 181 with the gap therebetween. In addition, the first wall portion 181 is arranged to have a radial thickness greater than that of the second wall portion 182. A force may be applied to the first wall portion 181 due to the drawn-out wire 146 being wound therearound. The above arrangement leads to improved strength of the first wall portion 181.

The drawn-out wire 146 is arranged to be in contact with both the radially outer surface 1811 and the radially inner surface 1812 of the first wall portion 181. That is, at least a portion of the drawn-out wire 146 is arranged to extend in the circumferential direction along the radially outer surface 1811 of the first wall portion 181. In addition, the drawn-out wire 146 is arranged to be in contact with both the radially inner surface 1812 and the radially outer surface 1811 of the first wall portion 181. Further, at least a portion of the drawn-out wire 146 is arranged between the first wall portion 181 and the second wall portion 182. In the present example embodiment, one or more turns of the drawn-out wire 146 are wound around the first wall portion 181 of the guide portion 18. At this time, the drawn-out wire 146 is brought into contact with the curved surfaces 184. Thus, when the drawn-out wire 146 is passed between the radially outer surface 1811 and the radially inner surface 1812, a stress concentration does not easily occur, and this leads to a reduced load on the drawn-out wire 146. Then, an end of the drawn-out wire 146, which has been wound around the first wall portion 181, is fixed to the corresponding connection portion 31 on the circuit board 30. The drawn-out wire 146 may be fixed to the corresponding connection portion 31 through, for example, soldering.

The drawn-out wire 146 drawn out from the corresponding coil 143 is once wound around the corresponding guide portion 18, and is then connected to the corresponding connection portion 31. When the motor 10 is assembled, the stator 14, which is assembled in advance, is fixed to the housing 112. Each coil 143 is defined by the conducting wire being wound around the corresponding tooth 145 in the stator 14 before the stator 14 is fixed to the housing 112. At this time, each of the drawn-out wires 146 and the coils 143 does not easily become slack, since each drawn-out wire 146 is wound around the corresponding guide portion 18. This leads to an easier manufacturing operation when the motor 10 is manufactured. In addition, winding of the drawn-out wire 146 around the corresponding guide portion 18 enables a force acting on the drawn-out wire 146 to be received by the corresponding guide portion 18. This contributes to preventing the drawn-out wire 146 from moving when the drawn-out wire 146 is fixed to the corresponding connection portion 31.

When the drawn-out wire 146 is fixed to the corresponding connection portion 31, the drawn-out wire 146 may sometimes be pulled in the direction of the corresponding connection portion 31. That is, a downward force may sometimes act on the drawn-out wire 146. The bend portion 183 is connected to the lower end portion of the first wall portion 181, and is arranged to extend radially outward therefrom. Therefore, acting of a downward force on the drawn-out wire 146 would bring the drawn-out wire 146 into contact with an upper surface of the bend portion 183. A movement of the drawn-out wire 146 is thus prevented or minimized when the drawn-out wire 146 is fixed to the corresponding connection portion 31.

Each guide portion 18 is arranged at such a position that a portion of the guide portion 18 is axially opposed to the rotor magnet 151. That is, at least a portion of each guide portion 18 is arranged axially opposite to the rotor magnet 151. The drawn-out wire 146 guided by the guide portion 18 is arranged below the rotor 15 with a space between the drawn-out wire 146 and the rotor 15. This leads to preventing a contact between the drawn-out wire 146 and the rotor 15.

Each connection portion 31 is arranged radially outward of the radially outer edge of the corresponding bend portion 183. That is, the connection portion 31 is arranged radially outward of the radially outer edge of the corresponding bend portion 183. Further, each connection portion 31 is arranged radially outward of the magnet holder 152 of the rotor 15. That is, the connection portion 31 is arranged radially outward of the magnet holder 152. This arrangement makes it possible to fix each drawn-out wire 146 to the corresponding connection portion 31 with the shaft 12 fixed to the rotor 15 being attached to the base portion 11, and leads to increased operation efficiency. In addition, even in the case where the shaft 12, the rotor 15, and the impeller 20 are fixed to one another through an insert molding process, for example, the connection portions 31 can be arranged at a large distance from the insulator 142. Thus, a jig used to fix each drawn-out wire 146 to the corresponding connection portion 31 or the like can be easily placed at a proper position, and this leads to increased operation efficiency.

Note that, although the insulator 142 is provided with two of the guide portions 18, this is not essential to the present disclosure. The number of guide portions 18 may be one in the case where a plurality of drawn-out wires 146 can be wound around the guide portion 18, for example. Also note that, when the number of drawn-out wires 146 is more than one, for example, the number of guide portions 18 may be equal to the number of drawn-out wires 146. That is, the number of guide portions 18 may be the same as the number of drawn-out wires 146.

Figure 18:
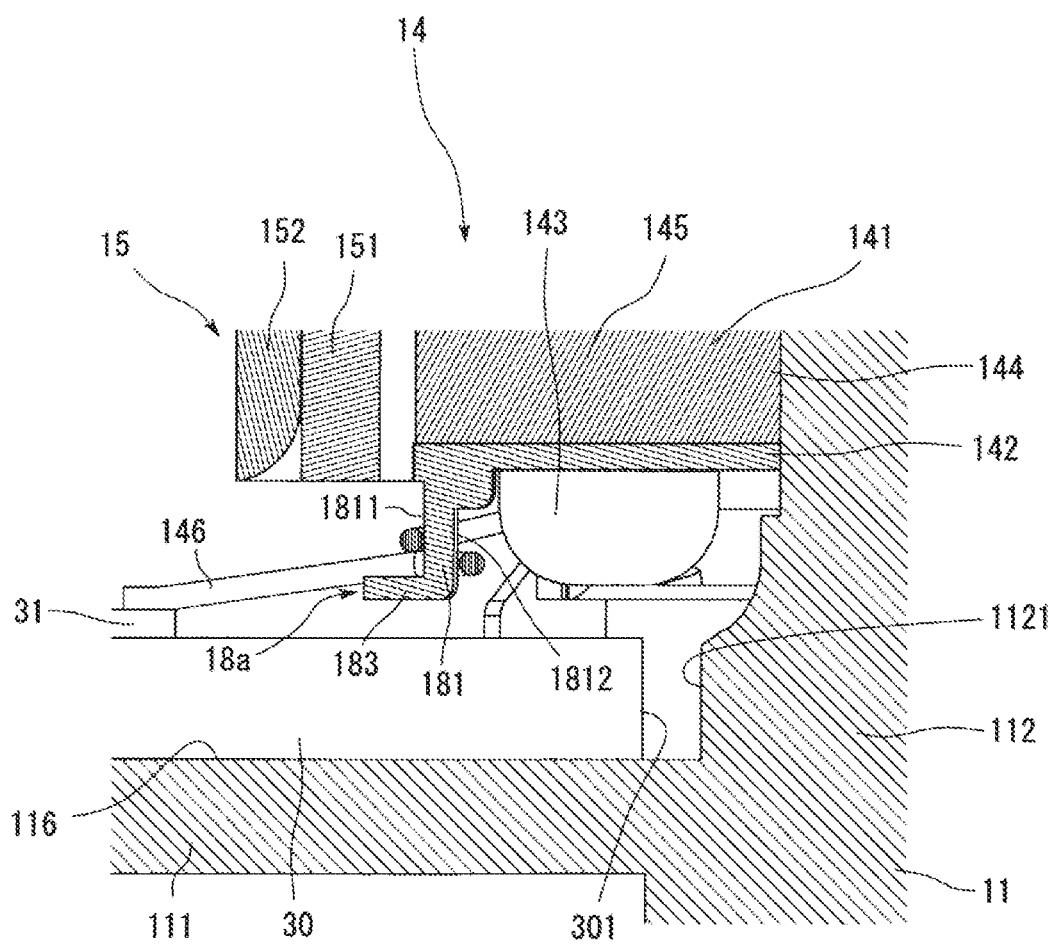
FIG. 18 is an enlarged sectional view of a base portion and a stator including a guide portion according to a modification of the above example embodiment of the present disclosure.

FIG. 18 is an enlarged sectional view of a base portion 11 and a stator 14 including a guide portion 18a according to a modification of the present example embodiment of the present disclosure. As illustrated in FIG. 18, the guide portion 18a includes a first wall portion 181 and a bend portion 183. That is, the guide portion 18a is different from the guide portion 18 in that the second wall portion 182 is omitted. The guide portion 18a is otherwise identical in structure to the guide portion 18. Accordingly, in the following description of the guide portion 18a, portions of the guide portion 18a which have their equivalents in the guide portion 18 are denoted by the same reference numerals as those of their equivalents in the guide portion 18, and detailed descriptions of such portions will be omitted.

For example, in the case where a drawn-out wire 146 does not easily slip out of place with a plurality of turns of the drawn-out wire 146 being wound around the first wall portion 181, a slackening of the drawn-out wire 146 does not easily occur even if the second wall portion 182 is omitted. In addition, even if a downward force acts on the drawn-out wire 146, the drawn-out wire 146 is brought into contact with an upper surface of the bend portion 183. A movement of the drawn-out wire 146 is thus prevented or minimized when the drawn-out wire 146 is fixed to a corresponding connection portion 31.

Next, a method of assembling the blower apparatus A will now be described below. In the blower apparatus A, the flange portion 167 of the tip holder 161 is fixed to the housing 112 through the insert molding process. The tip holder 161 is arranged to open upward, i.e., toward the recessed holding portion 115 of the housing 112. The attraction magnet 162 is inserted into the tip holder 161. At this time, the lower surface 1622 of the attraction magnet 162 is brought into contact with the second surface 1652 of the bottom portion 165 of the tip holder 161.

The lower surface 1622 and the second surface 1652 are fixed to each other through the magnetic force. At this time, a magnetic force also acts between the tubular portion 166 and a side surface of the attraction magnet 162. A portion of the attraction magnet 162 is thus brought into contact with an inside of the tubular portion 166. The upper surface 1621 of the attraction magnet 162 is arranged at a level lower than that of the flange portion 167. That is, the attraction magnet 162 is housed in the tubular portion 166. Thus, the tubular portion 166 serves as the back yoke for the attraction magnet 162 to strengthen the magnetic force of the attraction magnet 162. In addition, the thrust plate 163 is arranged on the upper surface of the attraction magnet 162. The thrust plate 163 is housed inside of the tubular portion 166.

Then, the retaining ring 19 is inserted into the recessed holding portion 115, and thereafter, the bearing 13 is press fitted into the recessed holding portion 115 from above the retaining ring 19. Thus, the retaining ring 19 is fixed by being held between the lower end portion of the bearing 13 and the bottom surface of the bearing holding portion 1151.

The circuit board 30 is mounted on the board mounting portion 116 of the base portion 11. At this time, the bosses 117 are passed through the respective board through holes 303 of the circuit board 30, and the circuit board 30 is fixed to the base portion 11 while being held by the board holding portions 17 in the vicinity of the inside flat surface 301 and the outside flat surface 302. The lead wires Wr, which are connected to the external power supply, are connected to the respective external connection portions 32 of the circuit board 30 fixed to the base portion 11. Then, the lead wires Wr are caught on the respective lead wire leading portions 1131 of the arm portion 113.

Then, the insulator 142 is attached to the stator core 141, and the conducting wire is wound around each of the teeth 145 with the insulator 142 therebetween to define the coils 143. At this time, each of the drawn-out wires 146 drawn out from the coils 143 is wound around the corresponding guide portion 18. At this time, the end of each drawn-out wire 146 is drawn out radially outwardly of a radially outer edge of the stator 14.

Then, the stator 14 is attached to the base portion 11 with the core back 144 of the stator 14 being arranged outside of the housing 112. At this time, the stator 14 is fixed to the housing 112. Then, an end portion of each of the drawn-out wires 146 drawn out from the coils 143 is fixed to the corresponding connection portion 31 of the circuit board 30 through soldering. Since the connection portions 31 are arranged radially outside of the stator 14, each drawn-out wire 146 can be easily fixed to the corresponding connection portion 31.

The upper end portion of the shaft 12 is fixed to the boss portion 224 of the impeller 20. Then, the rotor 15, including the rotor magnet 151 and the magnet holder 152, is attached to the hub tubular portion 223. Then, the shaft 12 is inserted into the recessed holding portion 115 from above. At this time, the shaft is passed through the bearing 13. Then, the lower surface convex portion 122 of the shaft 12 is pressed against and into the through hole of the retaining ring 19. Note that the diameter of the through hole of the retaining ring 19 is smaller than the outside diameter of the shaft 12, but is large enough to allow the lower end portion of the shaft 12 to pass through the through hole of the retaining ring 19 when the retaining ring 19 has been elastically deformed. Then, the retaining ring 19 is moved to such a position that the retaining ring 19 radially overlaps with the retaining groove 121 of the shaft 12. At this time, the lower surface convex portion 122 is brought into contact with the thrust plate 163. When the shaft 12 has been attached to the bearing 13, the radially outer surface of the stator 14 is radially opposed to an inner surface of the rotor magnet 151.

In the blower apparatus A assembled in the above-described manner, the radially outer edge of the stator 14 and the rotor magnet 151 are radially opposed to each other with a gap therebetween as a result of the shaft 12 being fitted in the recessed holding portion 115 of the housing 112 with an intervention of the bearing 13. Then, magnetic forces are generated between the coils 143 and the rotor magnet 151 as a result of the electric current being passed to the coils 143 through the drawn-out wires 146. Attraction and repulsion of the magnetic forces cause a torque to act on the rotor 15. The rotor 15, hence the shaft 12, is thus caused to rotate about the central axis J. Then, the impeller 20, which is fixed to the shaft 12, is caused to rotate to generate an air flow.

While example embodiments of the present disclosure have been described above, various modifications and combinations of features of the example embodiments are possible without departing from the scope and spirit of the present disclosure.

Example embodiments of the present disclosure are applicable to, for example, motors designed to rotate an impeller of a blower apparatus.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A motor comprising:
a shaft that extends along a central axis extending in a vertical direction;
a rotor capable of rotating about the central axis;
a stator radially opposite to the rotor; and
a circuit board below the stator; wherein
the stator includes:
an annular core back;
a plurality of teeth extending radially from the core back and arranged in a circumferential direction;
an insulator to cover at least a portion of each of an upper surface, a lower surface, and circumferential side surfaces of each of the teeth;
coils each of which is defined by a conducting wire wound around a separate one of the teeth with the insulator therebetween; and
a drawn-out wire drawn out from the coils and electrically connected to the circuit board;
a lower portion of the insulator includes a guide located radially outward of the coils and including a first wall extending downward from a lower surface of the insulator and a bend extending radially outward from a lower end of the first wall;
at least a portion of the drawn-out wire extends in the circumferential direction along a radially outer surface of the first wall;
the first wall extends in the circumferential direction; and
the drawn-out wire is in contact with both a radially inner surface and the radially outer surface of the first wall.

2. The motor according to claim 1, wherein the first wall includes curved surfaces to join the radially outer surface and the radially inner surface to each other at both circumferential end portions thereof.

3. The motor according to claim 1, wherein
the guide further includes a second wall extending upward from a radially outer edge of the bend and located opposite to the first wall with a gap therebetween; and
at least a portion of the drawn-out wire is located between the first wall and the second wall.

4. The motor according to claim 3, wherein the first wall has a radial thickness greater than that of the second wall.

5. The motor according to claim 1, wherein
the circuit board includes a connection to which the drawn-out wire is connected; and
the connection is located radially outward of a radially outer edge of the bend.

6. The motor according to claim 5, wherein
the rotor includes a rotor magnet located radially opposite to the stator, and a magnet holder to hold the rotor magnet; and
the connection is located radially outward of the magnet holder.

7. The motor according to claim 6, wherein at least a portion of the guide is located axially opposite to the rotor magnet.

8. The motor according to claim 1, wherein a number of guides is equal to a number of drawn-out wires.

9. A blower apparatus comprising:
the motor of claim 1; and
an impeller fixed to the shaft of the motor.

* * * * *